United States Patent
Estkowski et al.

(10) Patent No.: US 7,447,593 B2
(45) Date of Patent: Nov. 4, 2008

(54) SYSTEM AND METHOD FOR ADAPTIVE PATH PLANNING

(75) Inventors: Regina I. Estkowski, Woodland Hills, CA (US); Peter A. Tinker, West Hills, CA (US)

(73) Assignee: Raytheon Company, Waltham, MA (US)

( * ) Notice: Subject to any disclaimer, the term of this patent is extended or adjusted under 35 U.S.C. 154(b) by 710 days.

(21) Appl. No.: 10/811,460

(22) Filed: Mar. 26, 2004

(65) Prior Publication Data
US 2005/0216181 A1 Sep. 29, 2005

(51) Int. Cl.
G06G 7/78 (2006.01)
G08G 1/16 (2006.01)
G05B 19/04 (2006.01)

(52) U.S. Cl. .................. 701/301; 701/200; 701/201; 700/250; 700/253

(58) Field of Classification Search .................. 341/79; 701/200, 201, 301; 700/250, 253
See application file for complete search history.

(56) References Cited

U.S. PATENT DOCUMENTS

| | | | |
|---|---|---|---|
| 5,974,420 A | 10/1999 | Lehman et al. | |
| 6,259,988 B1 | 7/2001 | Galkowski et al. | |
| 2001/0003191 A1 | 6/2001 | Kovacs et al. | |
| 2004/0139157 A1 | 7/2004 | Neely, III et al. | |

FOREIGN PATENT DOCUMENTS

WO WO 01/03412 A1 1/2001

OTHER PUBLICATIONS

J Bruce, M Veloso, "Real-Time Randomized Path Planning for Robot Navigation", Oct. 2002, pp. 2383-2388, Proceedings of the 2002 IEEE/RSJ Intl. Conference on Intelligent Robots and Systems.*
Kindel et al, Kinodynamic Motion Planning Amidst Moving Obstacles, Apr. 2000, IEEE, Proceedings of the 2000 IEEE International Conference of Robotics & Automation, 537-543.*
Urmson, Approaches for Heuristically Biasing RRT Growth, Oct. 2003, IEEE, Proceedings of the 2003 IEEE/RSJ Intl. Conference on Intelligent Robots and Systems, 1178-1183.*
Cem Hocaoglu, et. al., Planning Multiple Paths with Evolutionary Speciation, IEEE, vol. 5, No. 3, Jun. 2001, pp. 169-191.*
Carlos E. Thomaz, et. al., Mobile Robot Path Planning Using Genetic Algorithms, Springer Berlin, vol. 1606, 1999, pp. 671-679.*
Alan Schultz, Using a Genetic Algorithm to Learn Strategies for Collision Avoidance and Local Navigation, Proceedings of 7th International Symposium on Unmanned Untethered Submersible Technology, Sep. 23-25, 1991, pp. 213-215.*

(Continued)

Primary Examiner—Thomas G. Black
Assistant Examiner—Christine M Behncke
(74) Attorney, Agent, or Firm—Daly, Crowley, Mofford & Durkee, LLP

(57) ABSTRACT

A path planning system and method for an object, such as a vehicle, provides a randomized adaptive path planning that handles real-time path planning for a vehicle operating under kinodynamic constraints in dynamically changing and uncertain environments with probabilistic knowledge of vehicle and obstacle movement.

9 Claims, 21 Drawing Sheets

OTHER PUBLICATIONS

Steven M. Lavalle, Rapidly-Exploring Random Trees: Progress and Prospectspp. 2001, 1-16, University of Tokyo, Bunkyo-ku, Tokyo, Japan.

James Bruce, Real-Time Randomized Path Planning For Robot Navigation, Oct. 2002, pp. 1-6, Pittsburgh, PA.

Peng Chen, Resolution Complete Rapidly-Exploring Random Trees, May 2002, pp. 267-272, Washington DC.

Steven M. Lavalle, Randomized Kinodynamic Planning, May 1999, pp. 473-479, Detroit, Michigan.

EPO Partial European Search Report 46709.EP01 dated Apr. 26, 2004.

K. Edwards, Core Jini, Java Series, Jun. 1999, pp. 657-672.

Edwards K, Core Jini, Core Jini, XX, pp. 635-656.

Pedro Garcia, Oriol Montala, Charles Pairot and Robert Rallo, Move: Component Groupware Foundations for Collaborative Virtual Environments, Oct. 2002, pp. 55-62.

Erik Gutmann, Service Location Protocol: Automatic Discovery of IP Network Services, Jul. 1999, pp. 71-80.

PCT Partial Search Report 46709.EP01 dated Nov. 5, 2004.

PCT/US2005/005027 International Search Report dated Feb. 22, 2006.

D. Hsu, R. Kindel, J.-C Latombe, S. Rock, Randomized Kinodynamic Motion Planning with Moving Obstacles, Mar. 2002, pp. 1-36. Database Inspection on-line, The Institute of Electrical Engineers.

Steven M. Lavalle, James J. Kuffner, Jr., Randomized Kinodynamic Planning, May 10, 1999, pp. 473-479, vol. 1, Detroit, Michigan.

T. Sartini, M. Vendittelli, G. Oriolo, A Resolution-Adaptive Strategy For Probabilistic Motion Planning, Jun. 9, 2002, pp. 591-596, Piscataway, New Jersey.

Jun Miura, Hiroshi Uozumi, Yoshiaki Skirai, Mobile Robot Motion Planning Considering the Motion Uncertainty of Moving Obstacles, pp. 692-697, Oct. 12, 1999, Piscataway, New Jersey.

* cited by examiner

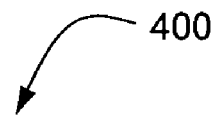

WHILE the stopping conditions given by *Method Component 8* are not satisfied
    DO *Deterministic Tree Extension.*
    DO *Random Tree Extension.*
    Set all leaf nodes that have not been extended in 3. or 4. to DEAD.
END WHILE

*Deterministic Tree Extension*

FOR each leaf node, N, that is not DEAD
    Apply *Method Component 5* and obtain a set, X, of candidate path extensions to N.
        FOR each candidate path extension, $\pi \in X$
            Apply *Method Component 7* to determine if $\pi$ is feasible.
            IF $\pi$ is feasible THEN extend N by $\pi$.
        END FOR
END FOR

*Random Tree Extension*

WHILE *Method Component 5* says to continue random extension
    Apply *Method Component 5* to obtain a set, $\Lambda$, of candidate nodes for random extension.
    FOR each node, $N \in \Lambda$, apply *Method Components 5 and 6* to obtain a set, X, of candidate path extensions
        to N.
        FOR each candidate path extension, $\pi \in X$
            Apply *Method Component 7* to determine if $\pi$ is feasible.
            IF $\pi$ is feasible THEN extend N by $\pi$.
        END FOR
END WHILE

*FIG. 4*

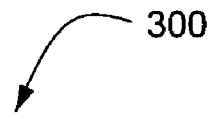

1. Add the root node at your current position to *T*;
2. Obtain the current *Turn Wedge* from the *VMM*;
3. FOR each of *#SN* directions determined by discrete uniform distribution In the *Turn Wedge*, attempt to extend in the direction;
4. END FOR;
5. IF it is not possible to extend in all *#SN* directions
6.     THEN choose at most *#RA* random directions within the *Turn Wedge* and attempt
    to extend in these directions until *#SN* extensions have been attained;
7. END IF;
8. WHILE (*Stop Flag* == FALSE)
    Set *Active Leaf List* = *New Leaf List*;
    Set *New Leaf List* to Empty;
        FOR each *Active* leaf node, *N*, in *T*
        Attempt to extend straight ahead from *N*;
            Attempt to extend towards the goal from *N*;
        END FOR;
        FOR each of the, at most, *#RN Active* leaf nodes having the best *NM*
        Obtain the current *Turn Wedge* from the *VMM*;
    Choose *#RE* random directions within the *Turn Wedge* and attempt to
    Extend in each of these directions;
        IF it is not possible to extend in all *#RE* directions
        THEN chose at most *#RA* random directions within the *Turn Wedge* and attempt to extend in these directions until *#RE*
    Extensions have been attained;
        END IF;
        END FOR;
        IF the *Stop Condition* has been met
            Set *Stop Flag* = TRUE;
    END WHILE;

*FIG. 5*

SYSTEM AND METHOD FOR ADAPTIVE PATH PLANNING

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to path planning and, more particularly, to planning possible paths for an object and/or vehicle.

BACKGROUND OF THE INVENTION

As is known in the art, there are situations in which it is desirable to plan a path for a vehicle. One known path planning technique is known as Rapidly-Exploring Random Trees (RRTs). However, RRT methods deal with small numbers of stationary obstacles and assume that there are fixed regions of the environment that must be avoided. One disadvantage of such methods is that they do not address moving objects, uncertain environments, or uncertain vehicle movements.

U.S. Pat. No. 6,259,988, discloses a real-time mission adaptable route planner that presents a path planning method for finding a path in two or three dimensions where vertices consist of nodes in a predetermined grid. The method disclosed in the '988 patent is essentially a graph search method that adds nodes to the existing path in a greedy manner. Nodes in the grid have 'cost' values associated with them and these costs are used in determining how to extend the path. Candidate nodes are added to the path using criteria based on the cost function at the node. To add nodes to the path a cost function is used. The constraints that are considered are maximum turn angle, minimum segment length, and maximum path length.

In U.S. Pat. No. 6,259,988, a further route planning method is disclosed in which costs are assigned to every cell in a predetermined grid so as to necessitate the computation of costs for the entire area. The costs for the entire grid are updated every iteration.

SUMMARY OF THE INVENTION

The present invention provides a randomized adaptive path planning method that handles real-time path planning for a vehicle operating under kinodynamic constraints in dynamically changing and uncertain environments with probabilistic knowledge of vehicle and obstacle movement. It is understood that as used herein the term "vehicle" is to be construed broadly to include virtually any type of entity for which it is desirable to plan a path. For example, an entity can include a vehicle, such as a submarine, as well as a mobile software agent operating in a network.

In general, the inventive method generates one or more paths from an initial vehicle start position to a goal location, or at least one partial path in the direction of the goal. Path characteristics, such as number of turns or length, may be constrained by a user. Avoiding obstacles or having low probability of intersecting regions that have some probability of containing obstacles may also provide constraints on the path. The output paths satisfy the constraints. Paths can also contain information about probability of contact (with an object or region to be avoided) along the path as well as a confidence level in the assessment. The paths can also contain time, velocity and acceleration information an the like, which can provide relevant state space information.

In addition to regions to avoid, paths may be formed taking into account regions for which it is desirable to visit. For example, a vehicle on its way to some location may be notified of a new target. It may be desirable to select a path that enables a strike at the target as the vehicle travels along its route.

A vehicle may have only probabilistic information about its environment due to sensor noise and incomplete coverage, for example. By incorporating probabilistic information with confidence levels along returned path options (possibly with reasons for such estimates), a preferred path can be selected based upon a variety of factors.

By finding paths using probabilistic models in a dynamic uncertain environment, the system can provide paths that may not have to be modified as often and may be safer than methods that do not incorporate simulation with probabilistic knowledge. An advantage of combining determinism with randomness is that it can provide straighter more direct paths that do not require complicated smoothing afterwards, while including the benefits of randomness (avoidance of local minima and more comprehensive searching with little overhead). Using determinism with randomness, while adapting the amount of randomness to the environment and the existing tree structure, enables the generation of a search tree that is efficient, yet broad enough that multiple path options can generally be found even in relatively tight environments.

BRIEF DESCRIPTION OF THE DRAWINGS

The invention will be more fully understood from the following detailed description taken in conjunction with the accompanying drawings, in which:

FIG. 4 is a textual representation of an exemplary implementation of adaptive path planning in accordance with the present invention;

FIG. 5 is a textual representation of a further exemplary embodiment of adaptive path planning in accordance with the present invention;

DETAILED DESCRIPTION OF THE INVENTION

Figure 1:
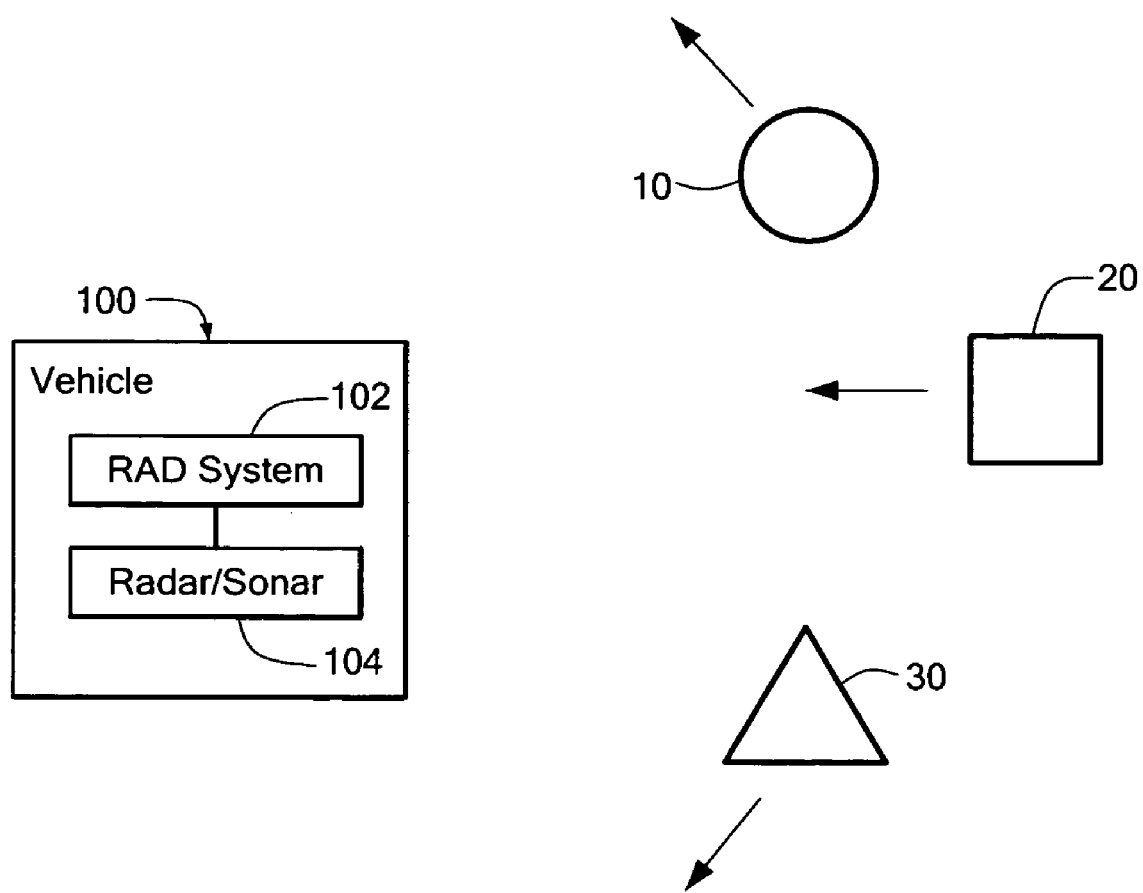
FIG. 1 is a schematic depiction of a vehicle having a path planning system in accordance with the present invention.

FIG. 1 shows an exemplary vehicle 100 having a path planning system 102 in accordance with the present invention. The vehicle 100 can include a radar/sonar 104 system coupled to the path planning system 102 for detecting other vehicles/objects 10, 20, 30. In one particular embodiment, the vehicle 100 is a submarine and the vehicles/objects 10, 20, 30 can correspond to other submarines, ships, non-navigable areas, and the like, that can be friendly or hostile. In general, certain attributes can be assigned to the vehicles/objects 10, 20, 30, such as speed, heading, acceleration, etc. that can be considered when planning a path to avoid the vehicles/objects.

While the path planning system 102 is primarily shown and described as having an onboard radar/sonar system for detecting objects and vehicles, it is understood that the vehicle/object information can be provided from a remote device, vehicle, satellite, etc. In addition, it is understood that the path planning system 102 can also be remote from the vehicle. For example, a central command center can ascertain vehicle/object information, plan a route for a given vehicle, and provide the route information to the given vehicle. Vehicle and objects can be identified by a satellite, for example, which can provide this information to the command center or vehicle. Further, the vehicle and objects can include a wide variety of moving and non-moving items that can be friendly, non-friendly, neutral, etc.

The inventive path planning system and method can be referred to as a Randomized Adaptive (RAd) Path Planning for handling real-time path planning for a vehicle operating under kinodynamic constraints in dynamically changing and uncertain environments with probabilistic knowledge of vehicle movement.

Before describing the invention in further detail, some elements and definitions are provided. A state space is defined. A vehicle is to be routed through this state space. A vehicle is generally located at an initial start position in state space and a goal region in the state space is identified to which the vehicle is attempting to reach or travel towards. It is understood that the goal locations may change over time. Moving and stationary objects and regions that the vehicle should avoid are identified and defined. The state space location or existence of these objects and regions may be known only probabilistically. Moving and stationary objects or regions that the vehicle would like to avoid but are not necessary to avoid can also be defined. In addition, constraints on vehicle movement and constraints on output paths can be defined.

The inventive path planning method generates one or more paths from the vehicle initial start state to the goal, or at least one or more partial paths in the direction of the goal. The paths can incorporate user constraints and can also contain information about probability of contact (with an object or region to be avoided) along the path, and confidence level in the assessment. The paths can also contain state space information.

In planning a path, a variety of components can be considered. A topological space of probability distributions over the state space can be defined along with probabilistic models of obstacle motion and location in state space. The state space is a topological space whose elements include considered states of the system of interest. For example, in the case of routing a vehicle through a three dimensional (3D) environment containing moving obstacles and the vehicle, one can consider relevant aspects of the environment as a system. As a simple example, one can define a state space for each obstacle to consist of all possible locations of the obstacle. This space can be defined as (R, T), where $R \subset \mathfrak{R}^3$ is given by $$R=\{(x,y,z): \min \text{Lon} \leq x \leq \max \text{Lon}, \min \text{Lat} \leq y \leq \max \text{Lat}, \min \text{Alt} \leq z \leq \max \text{Alt}\},$$

where Lon refers to longitude, Lat refers to latitude, and Alt refers to altitude, and $T \subset \mathfrak{R}$ is given by $T=\{t: \min \text{Time} \leq t \leq \max \text{Time}\}$. One can consider the state space(R, T) as a probability space defined in the standard manner as the product of probability spaces. The obtained product probability measure is denoted as P(R, T). One may also consider $$\prod_O (R, T)$$

as the state space consisting of all possible locations of all obstacles. Other possible variables in the state space include speed, direction of travel, and danger level.

In an exemplary embodiment, probability distributions correspond to obstacles in the state space. For each obstacle O, assume there is a probability density function $\phi_o:(R, T) \rightarrow \mathfrak{R}$ such that for any Borel basis set, $B \subset (R, T)$, the probability that O is in B is given by $$P(O \in B) = \int_B \varphi_0 dP(R, T).$$

The function $\phi_o$ induces a probability measure, $\mu_o$, on (R, T). One can take this as a probability distribution corresponding to the obstacle O. It Should be noted that in the general case, there may be no closed form representation of $\phi_o$, nor is it necessary that such a closed form representation exist.

In general, a distance between probability distributions can be defined. For example, one can define a distance, $d(\cdot,\cdot)$, between probability distributions in such a manner that if $\{\mu_n\}$ is a sequence of probability distributions (i.e. probability measures) on (R, T), then $d(\mu_n,\mu) \rightarrow 0$ iff for every bounded measurable function $f: (R, T) \rightarrow \mathfrak{R}$, then, $$\int_{(R,T)} f d\mu_n \rightarrow \int_{(R,T)} f d\mu \dots$$

It can be noted that the second condition $$\Rightarrow \int_B |\mu_n - \mu| d(R, T) \rightarrow 0$$

for every Borel set $B \subset (R,T)$. Additional discussion on defining this metric is contained in D. Crisan and A. Doucet, *A Survey of Convergence Results on Particle Filtering Methods for Practitioners*, IEEE Trans. On Signal Proc., p. 741, Vol. 50, No.3, March 2002, which is incorporated herein by reference.

It should be noted that any metric space is also a topological space and that the above condition placed on the metric induces the so-called "weak topology". In this manner, one obtains a topological space of probability distributions over state space. Note that a probability distribution, i.e., probability measure, is simply a function having certain properties.

It should be further noted that one can also define a probability distribution corresponding to the location of the vehicle to be routed. Along with the standard Euclidian distance between the most likely locations of the so-called ownship and obstacle, one can consider the distance between the ownship and obstacle probability distributions. In an intuitive sense, this corresponds to how much the two probability distribution overlap. Even if the Euclidean distance is considered sufficiently large, there may be considerable overlap of the probability distributions.

A probabilistic vehicle motion model can be defined that incorporates constraints on vehicle motion through state space. For example the turning and stopping ability of a submarine is relatively limited. Thus, turns may be relatively undesirable. A set of mechanisms or rules can be defined for obtaining candidate paths for deterministic tree extension. The amount of randomness at each stage can be determined for producing candidate nodes for random extension and determining when random extension is finished for the stage. A set of mechanisms or rules for obtaining candidate paths for random tree extension can also be determined. In addition, paths should be examined to some extent to determine if they are feasible. A mechanism can be defined to determine when to halt tree extension and a further mechanism can evaluate path quality. Another mechanism can select a set of path options from the final tree.

Figure 2A:
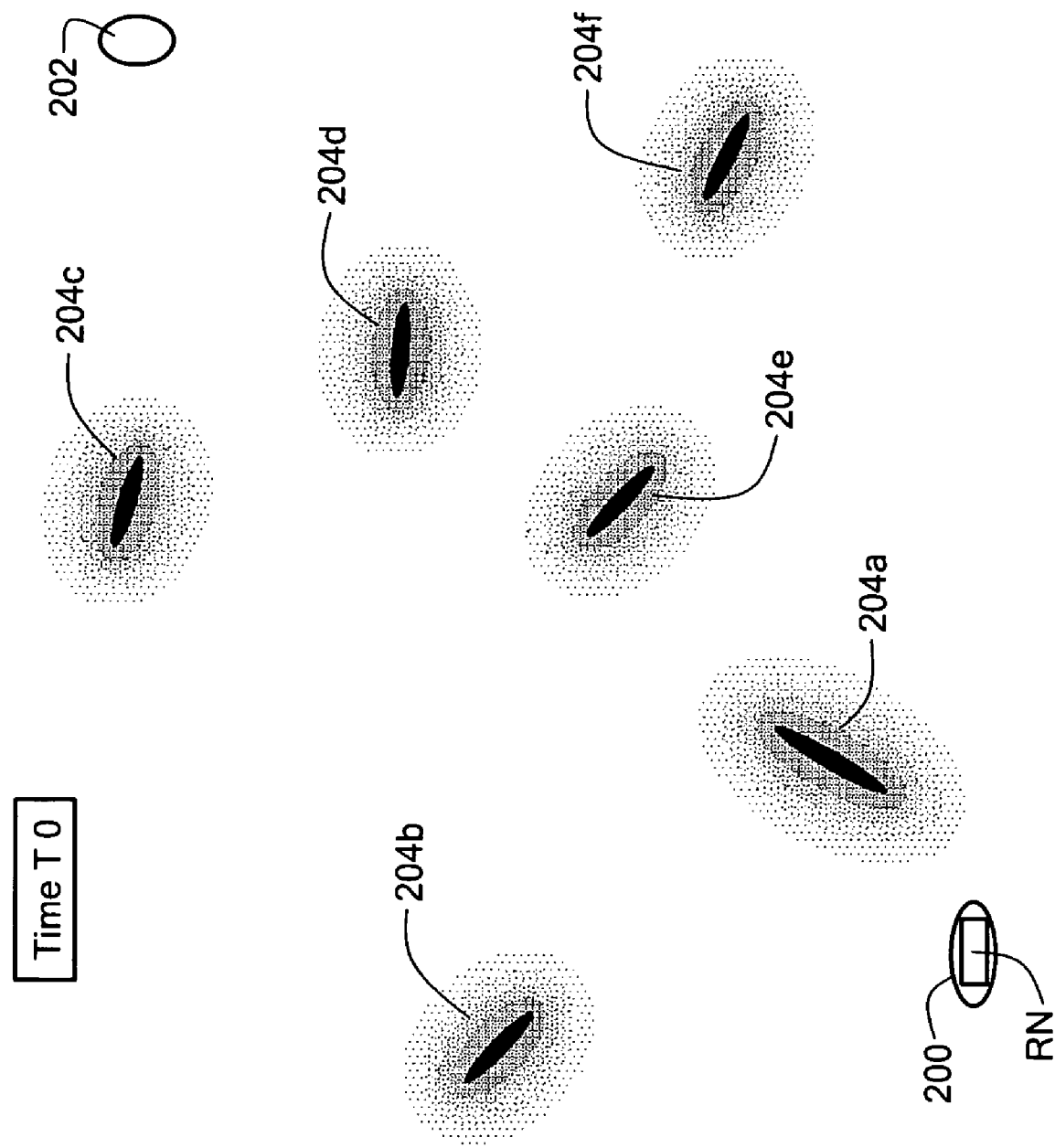
FIGS. 2A-L are pictorial representations of a sequential path planning process in accordance with the present invention.
Figure 2B:
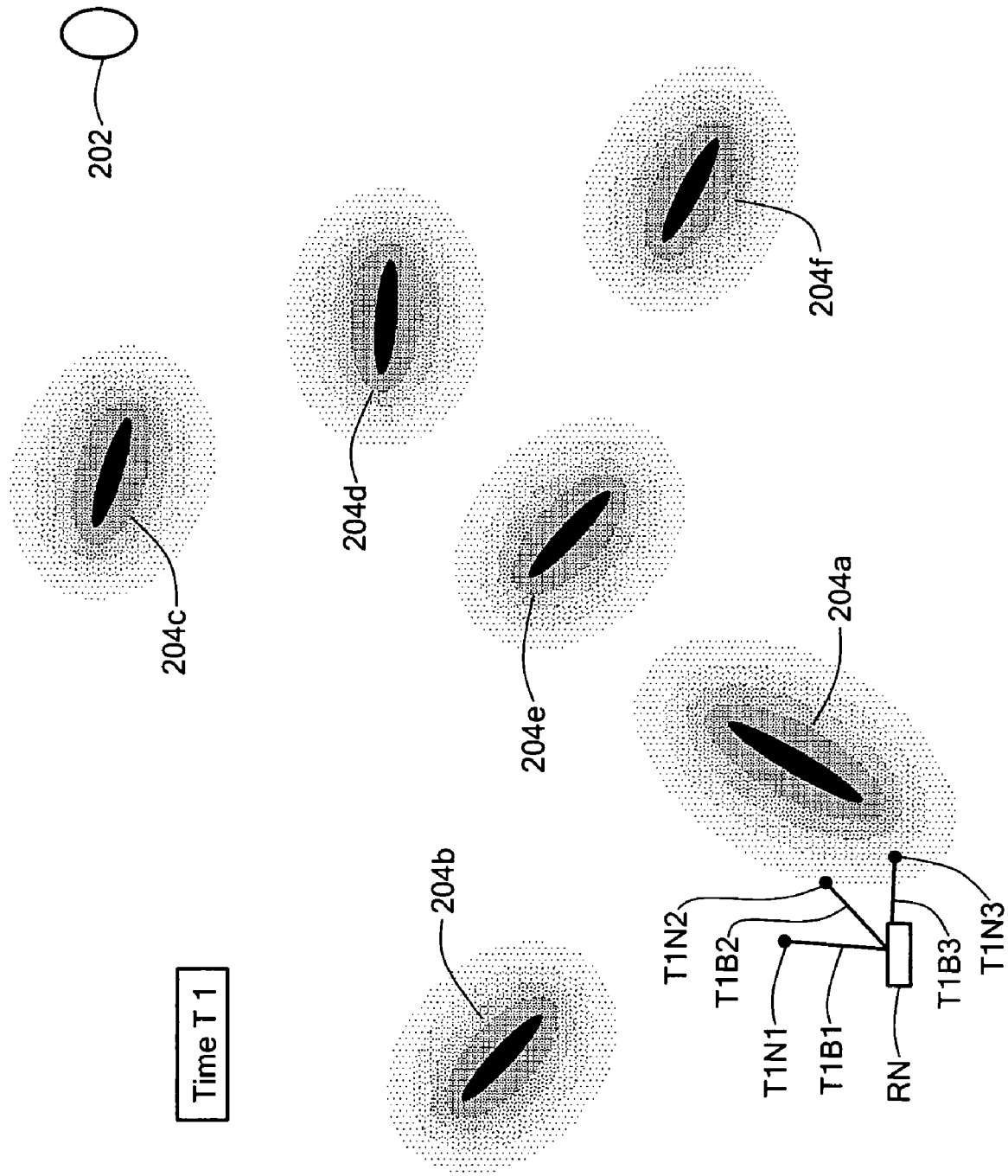

FIGS. 2A-2L show a sequential path planning over time in accordance with the present invention. In FIG. 2A, a target vehicle 200, e.g., a submarine, desires to reach a goal location 202 and avoid objects 204a-f, e.g., submarines and ships. The target submarine 200 starts from an initial location RN, which can be defined as the root node in the state space, at time T0. In FIG. 2B, which corresponds to time T1, a series of branches T1B1, T1B2, T1B3 extend from the root branch and terminate at respective nodes T1N1, T1N2, T1N3. It can be seen that some of the objects 204 have moved in relation to their position at time T0 (FIG. 2A).

It will be appreciated that the sequential path planning figures FIGS. 2A-L are intended to facilitate an understanding of the invention. While the length of branches may have some correlation with distance, it is understood that the figures are not drawn to scale. In addition, branches are shown extending from various nodes to generally show path planning in accordance with the invention without rigid application of the rules for extending the branches. That is, it will be appreciated that no inference should be made from the figures based upon the presence, or lack thereof, of a branch from a particular node. In addition, in actual practice is it likely that many more branches will be generated than is shown in FIGS. 2A-2L.

The objects 204 are shown surrounded by a shaded region corresponding to a probability distribution, which can form a part of the state information for each object. Object state information can include position, heading, velocity, acceleration, turning radius, etc. For example, a submarine object may have a heading and speed known at time T0. Given this information, a probability distribution can be defined for the position of the object at times T1, T2, etc. The probability distribution can take into account the confidence level of the state information. For example, if an object was actually cited at T0 heading in a known direction, the confidence level of the position would be relatively high for time T1. In addition, the probability of a submarine reversing course 180 degrees, for example may be quite low, which can be reflected in the shading so as to indicate this probability. Further, the limited turning ability of a submarine can also be taken into account. One of ordinary skill in the art will appreciate that a wide variety of parameters can be taken into account in the state information.

The branches can extend based upon a variety of rules including probabilistic rules, random rules and deterministic rules. In the present example of FIGS. 2A-2L, a first rule, which is deterministic, for extending branches includes generating a branch in a straight-ahead manner, e.g., branch T2B2 of FIG. 2C. For example, if no obstacles were located between the root node and the goal location a path would extend in a straight line from the root node to the goal location. A second rule, which is also deterministic, extends a branch into open space while taking into account the goal location. For example, in FIG. 2C, branch T2N1 is generated based upon the second rule. A third rule, which utilizes randomness, generates a branch into open space while also taking into account the goal location.

Figure 2C:
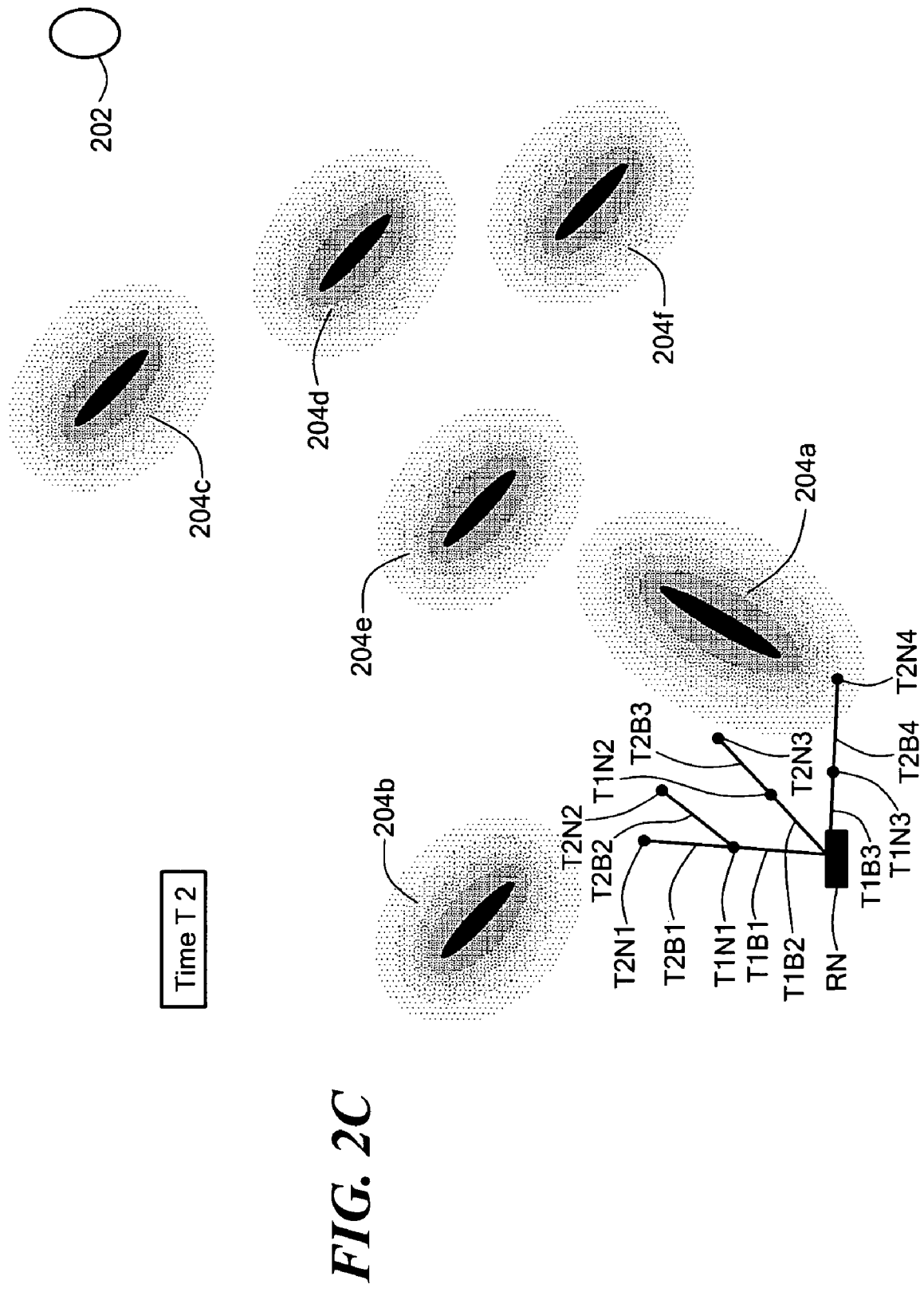

In FIG. 2C, which corresponds to time T2, branches T2B1, T2B2, T2B3, T2B4 extend from respective nodes T1N1, T1N2, T1N3 generated at time T1 and terminate at respective nodes T2N1, T2N2, T2N3, T2N4. The generation of the T2 branches T2B1, T2B3, T2B4 is based upon the first rule (straight-ahead branch). Branch T2B2 is based upon the second rule (branch towards goal). Note that the objects 204 have continued to move since time T1. It can be seen that the first object 204a is encroaching on node T2N3 and may interfere with the further extension of this path.

Figure 2D:
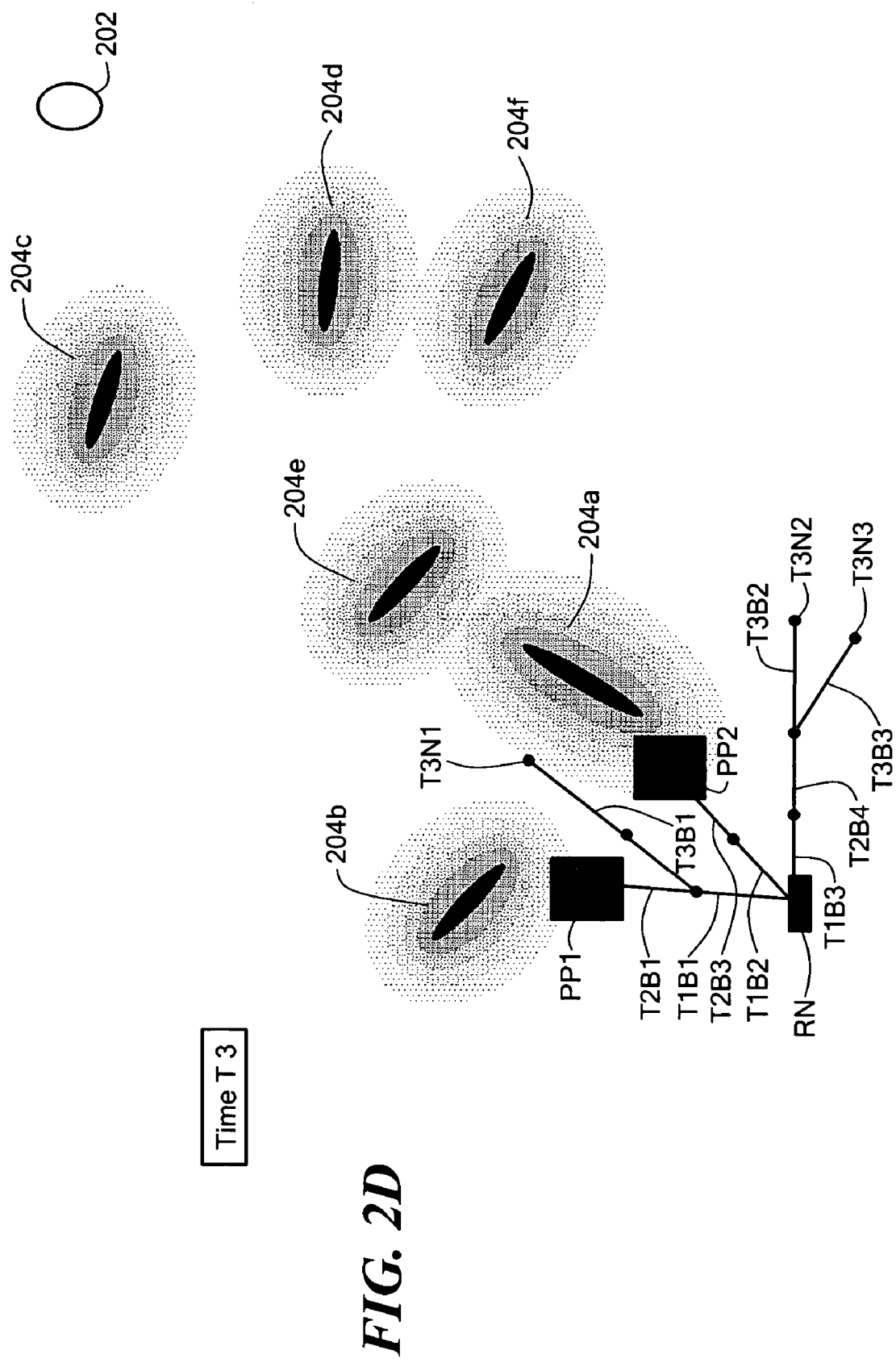

FIG. 2D, which corresponds to time T3, shows a pause PP1 of any extension from node T2N1 (FIG. 2C) and a similar pause PP2 of one cycle from node T2N3. These pauses PP1, PP2 correspond to the pausing of the path from the root node 200 for a cycle. When generating a vehicle path, the pauses PP1,PP2 may correspond to the vehicle stopping for a predetermined period of time. Such a pause may avoid a moving object, for example. Note that the pauses PP1, PP2 do not eliminate the paths as a possible route.

Further branches T3B1 terminating at node T3N1, T3B2 terminating at node T3N2, and T3B3 terminating at node T3N3 are generated at time T3. It can be seen that the branches T3B1, T3B2 are generated by the first rule and branch T3B3 is generated by the third rule.

It is understood that not all the branches generated by the first and second deterministic rules (straight ahead and towards the goal) and the third rule may not appear to extend from each node.

In an exemplary embodiment, each branch is first generated as a candidate branch and examined. Certain branches may be found to be infeasible, for example, as initiating contact with an object. Other rules may eliminate candidate branches. For example, a rule may preclude overlapping or redundant branches. Note that such overlapping refers to space and time, not just space. In addition, it is possible that branches overlap in space but not in space/time. A wide variety of additional rules for eliminating candidate branches will be readily apparent to one of ordinary skill in the art.

Figure 2E:
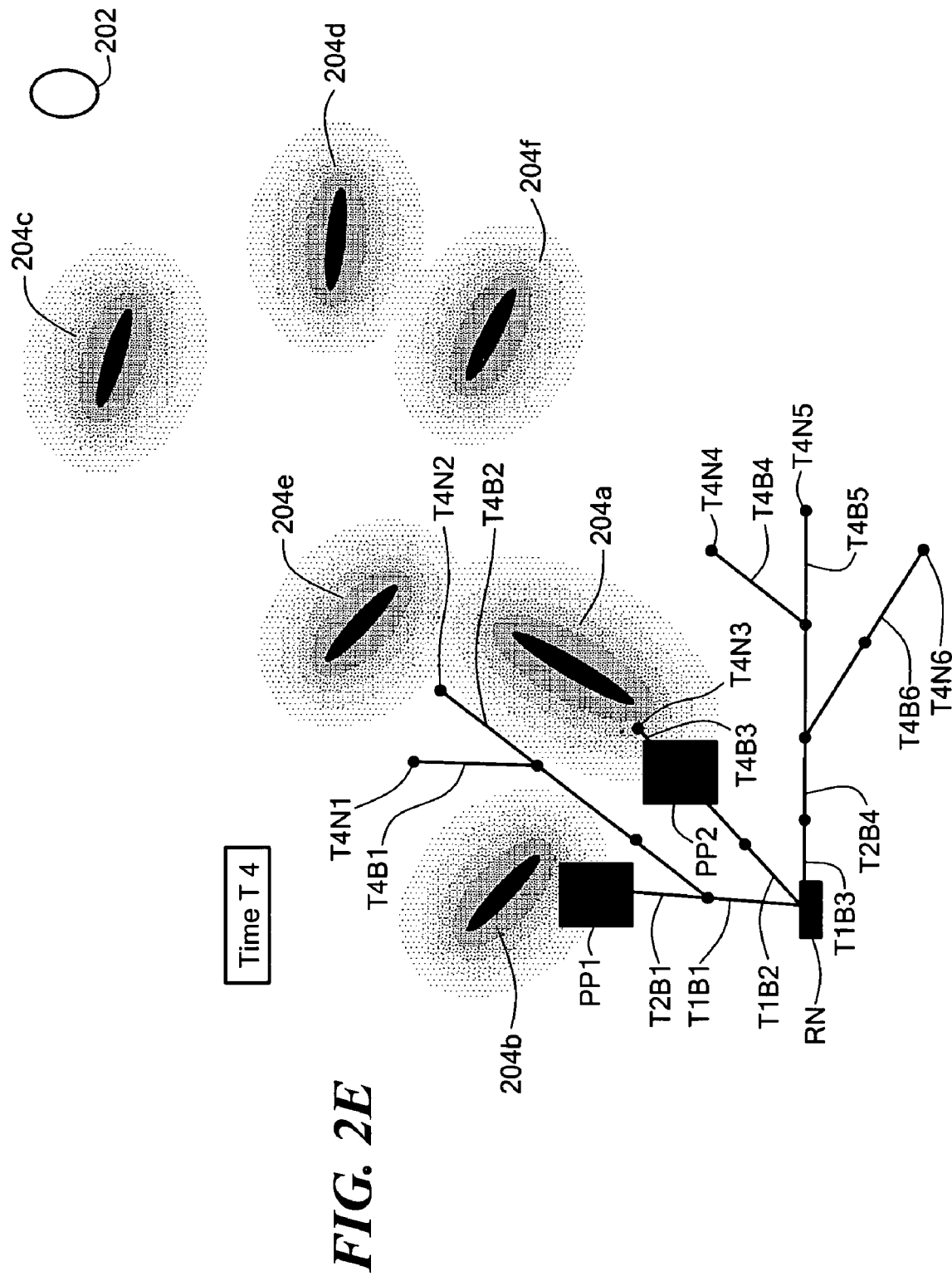
Figure 2F:
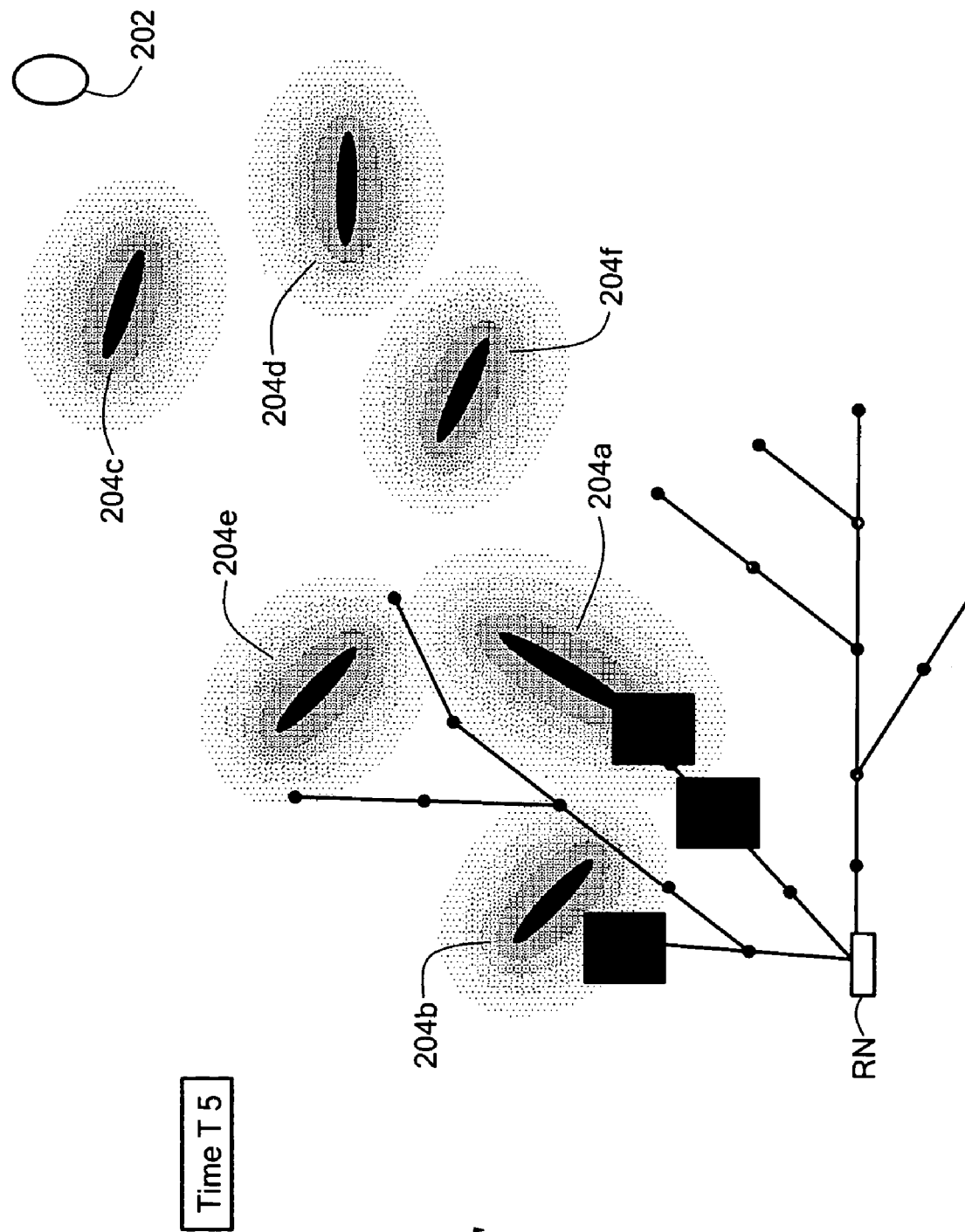
Figure 2G:
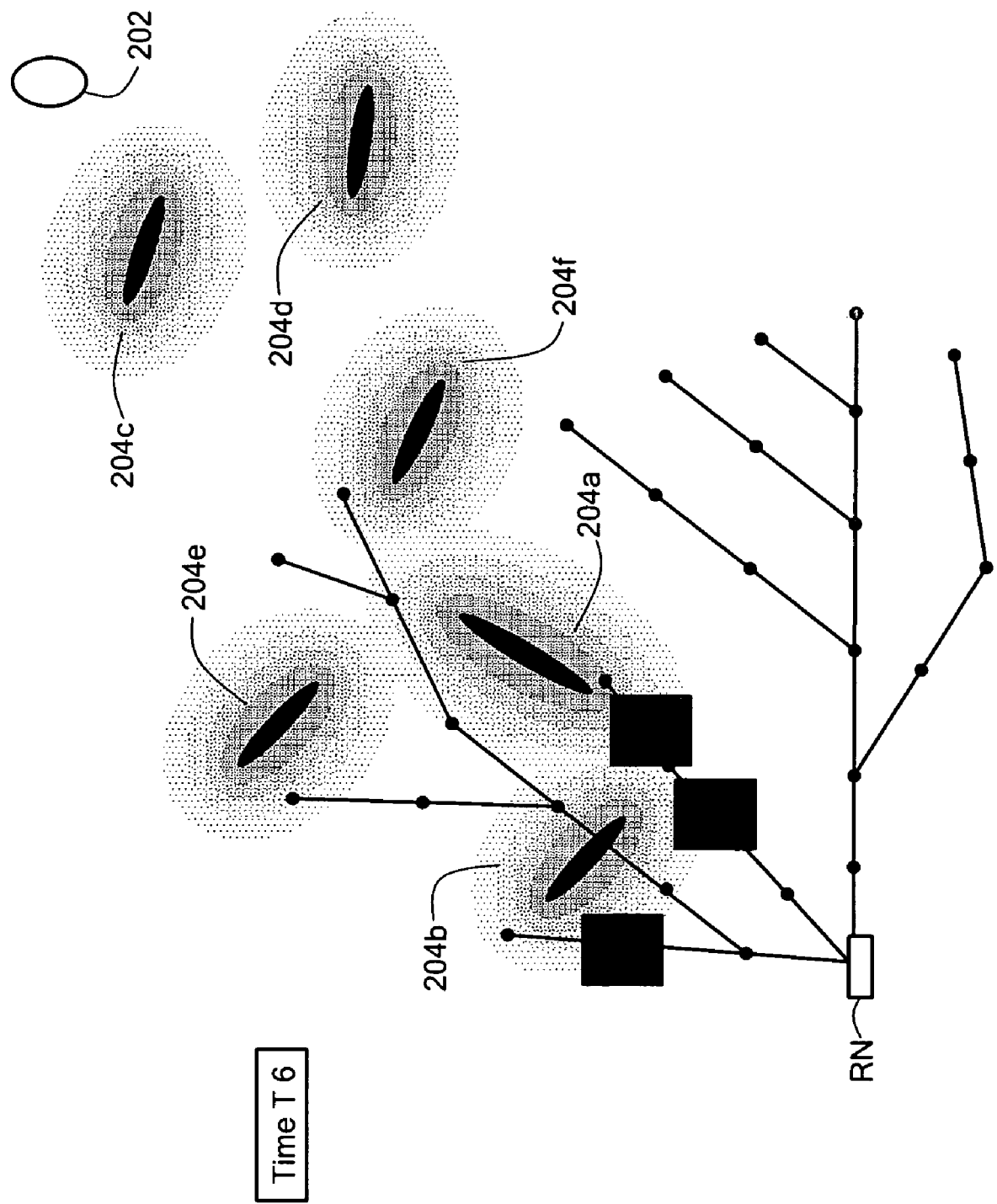

FIGS. 2E-L show the continued generation of branches over times T4-T10 and the continued object 204 movement over time. It is understood that to more clearly show changes over time branch and node labeling is limited. In FIG. 2E, the first pause PP1 is shown with a "2" indicating that branch generation is stopped for a second cycle. As can be seen, the two-cycle pause PP1 provides a path that avoids the first object 204a. In contrast, the second pause PP2 is shown again with a "1" and a branch T4B3 extending from the node T2N3 (not shown) from time T2. The relatively short length of this branch T4B3 reflects the vehicle 200 (not shown) having to accelerate from a stop and thus travel a relatively small distance.

Figure 2H:
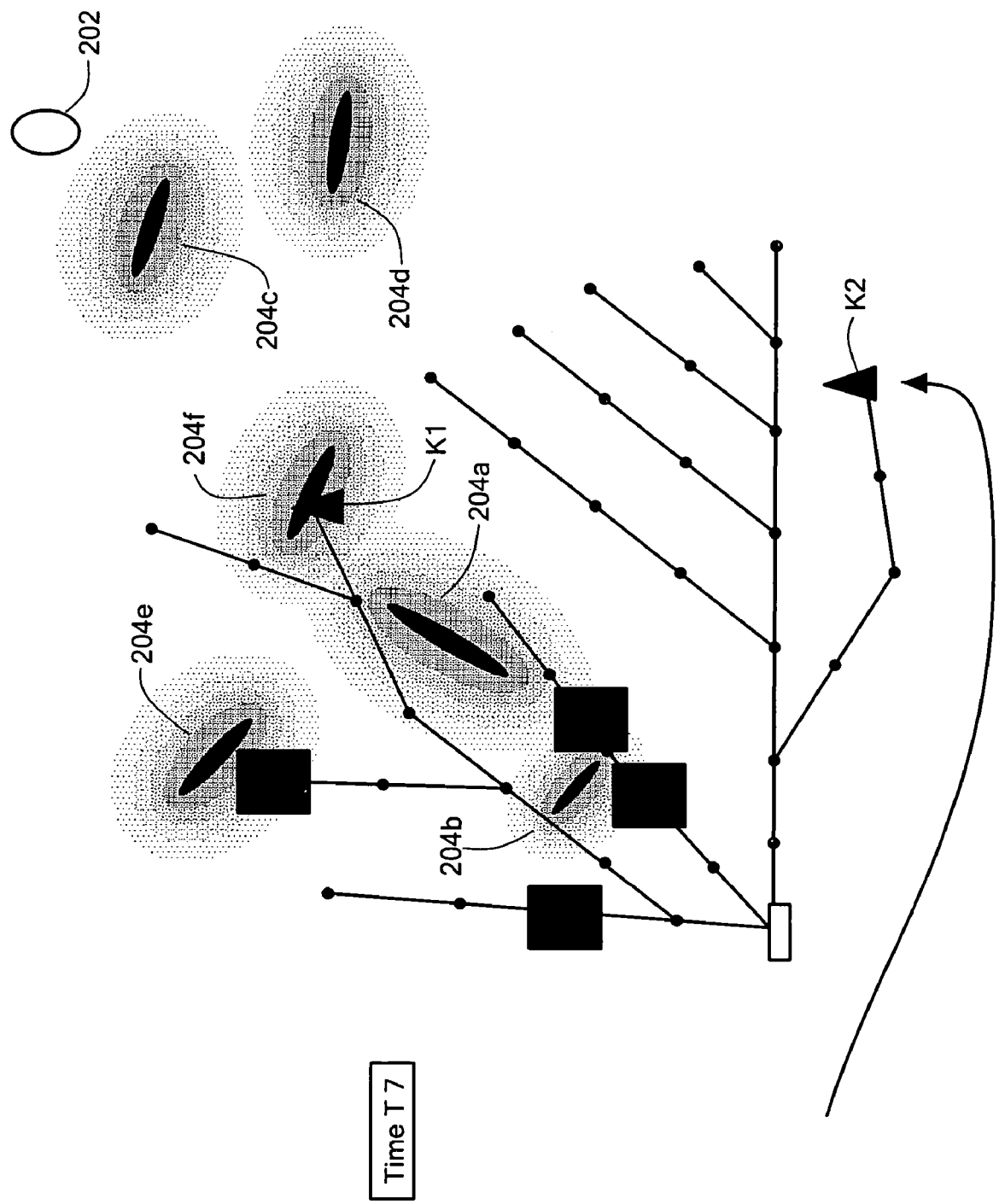
Figure 2I:
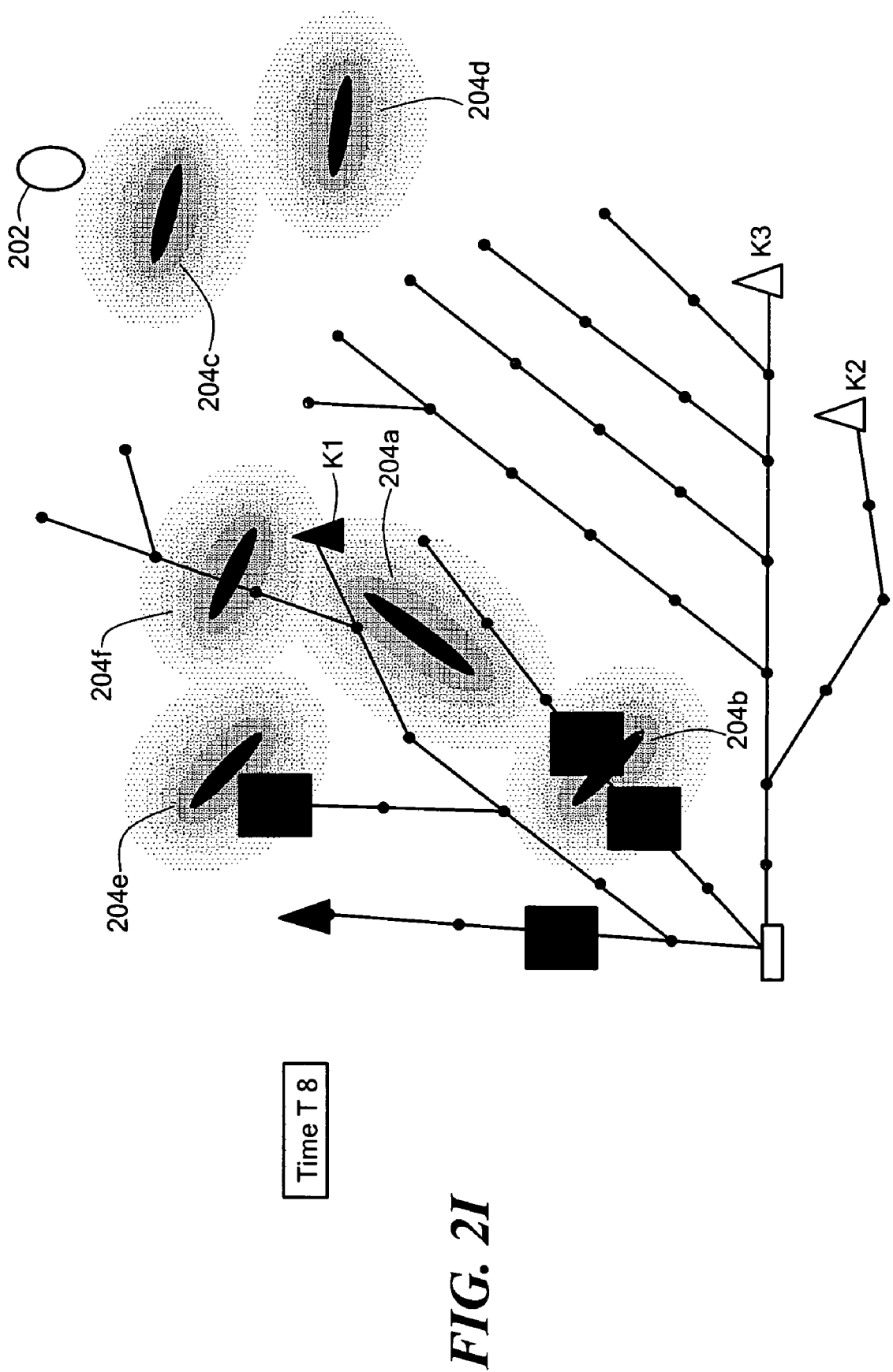
Figure 2J:
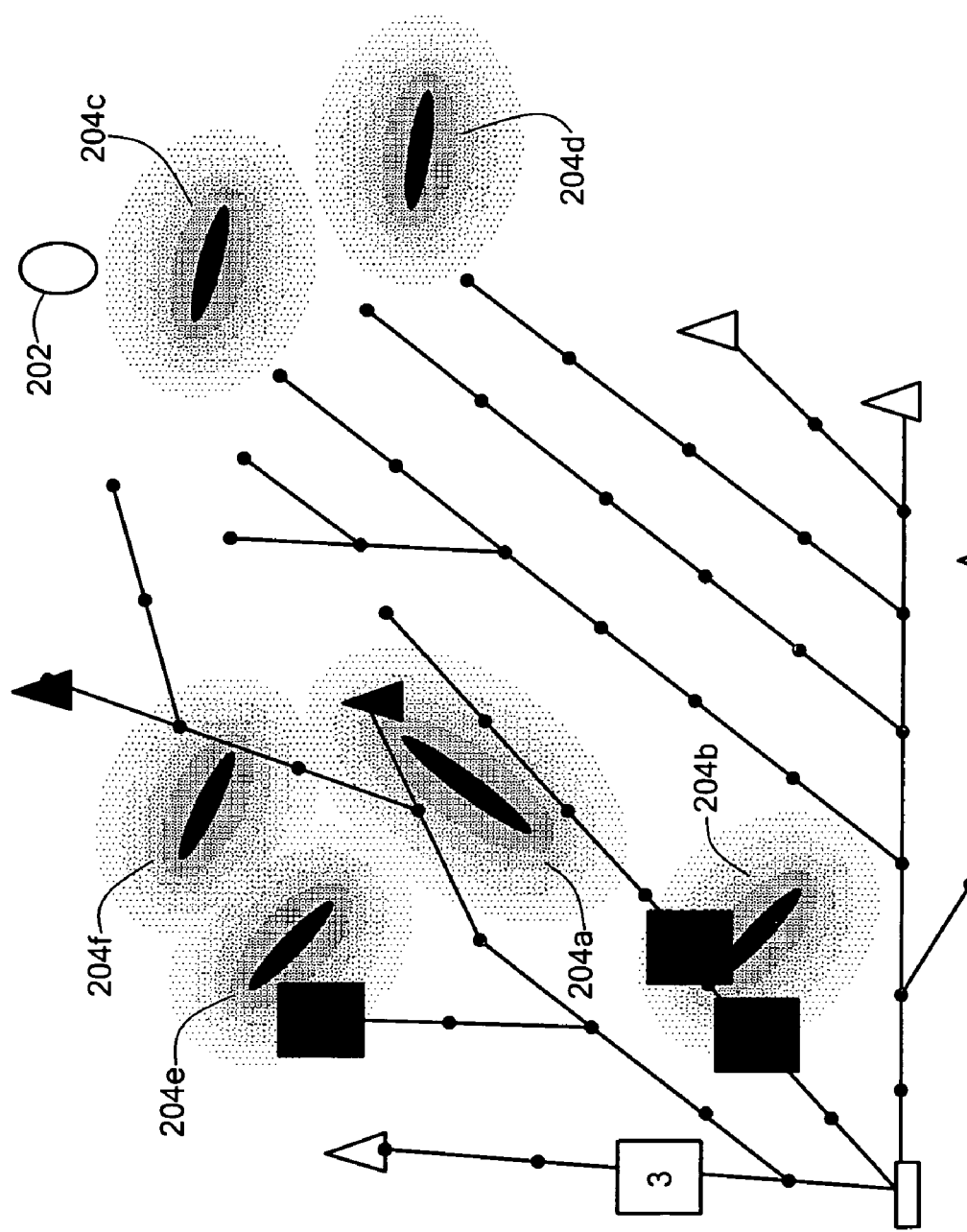

In FIG. 2H, two paths are terminated as indicated by first and second triangles K1, K2. The first path kill K1 results from a projected collision with the fifth object 204e. The second path kill K2 results from the path being too indirect in possibly reaching the goal location 202.

It will be appreciated that a wide variety of criteria can be used to kill further generation of a particular path. Exemplary criteria to kill further generation of a path include
1. In general: If there is no feasible extension the branch is killed.
   a. It may be impossible to satisfy motion constraints without hitting an obstacle. For example, the required speed or turning radius may be out of bounds.
   b. If the vehicle is airborne, the g-forces required for a particular maneuver may be too great.
2. Further information that is obtained from sensors or other sources may indicate that a branch thought to be clear from contact actually is not. New information on the location of known obstacles may come to light. Also, additional obstacles may be discovered.
3. The cost metric of the path may become too large. Some examples are given below.
   a. Distance traveled or time taken may become too large.
   b. The number of turns or number of other types of direction changes may become too large. For example, if the vehicle is airborne, the number of altitude changes may become too large.

While it may appear that some paths go across an object, it is understood that there would be no actual collision since the path branch over which a vehicle would travel is displaced in time from movement of the particular object. An analogy would be a person crossing the street before or after a car passes by.

Figure 2K:
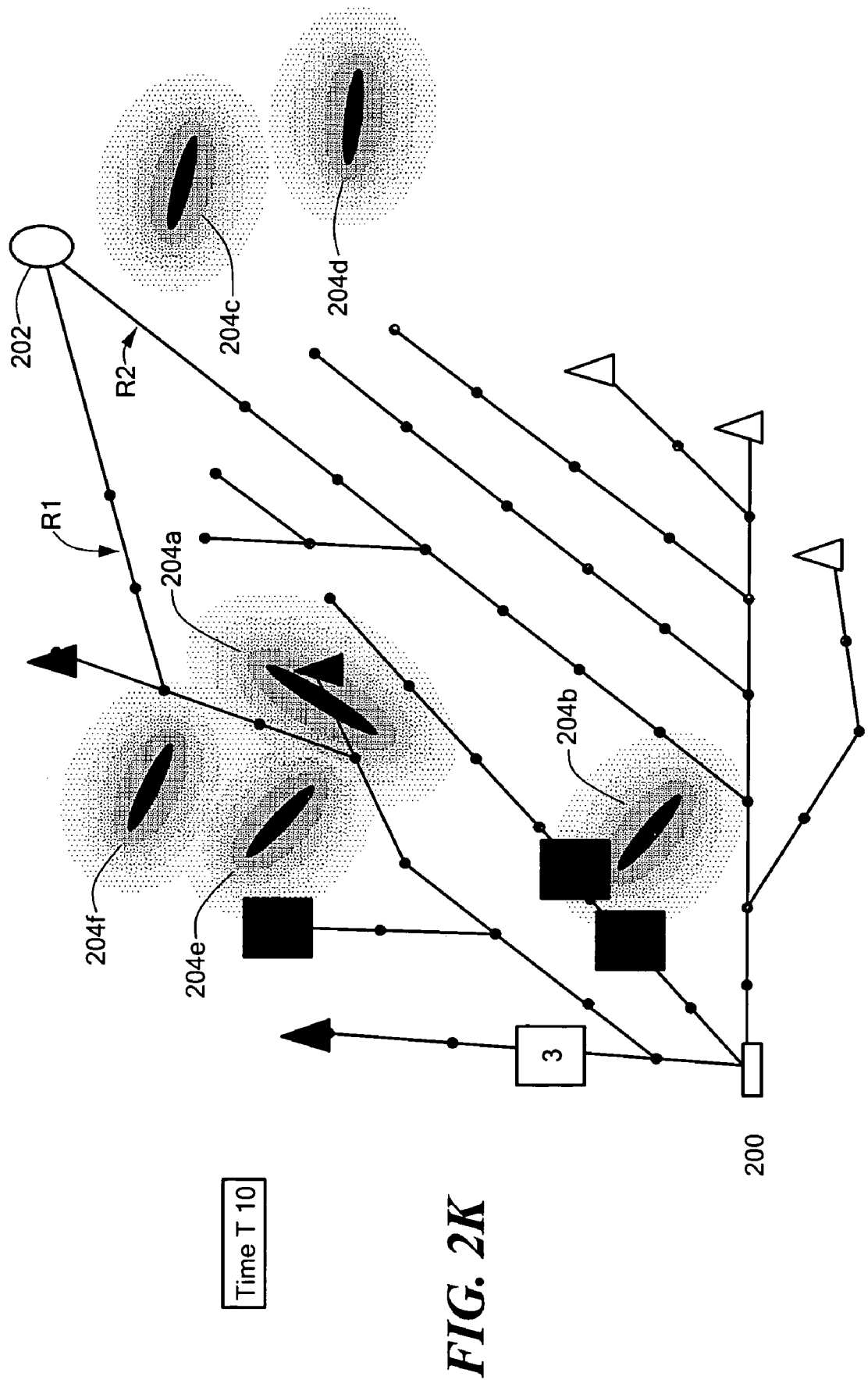
Figure 2L:
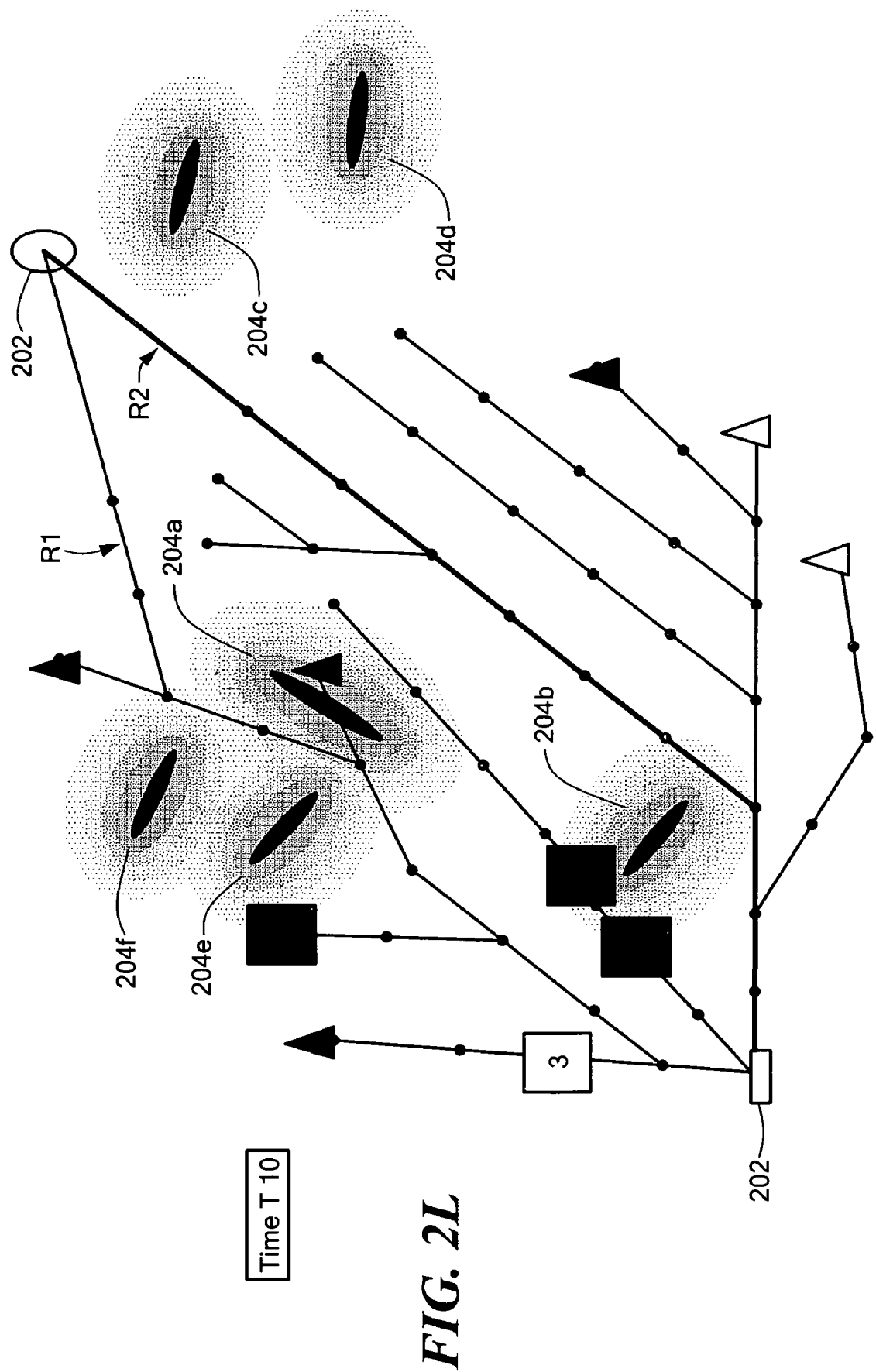

FIG. 2K shows first and second routes R1, R2 that reach the goal location 202 from the root node 200. FIG. 2L shows the second route R2 shown in bold to indicate a preference over the first route R1. In one particular embodiment, the second route R2 is selected over the first route R1 based upon the number of curves (one versus four) over the respective paths.

It is understood that selecting a route from a plurality of routes can be based upon a wide range of factors that can be weighted in a desired manner based upon the needs of a particular application. For example, for a submarine the number of turns can be weighted heavily due to the limited turning ability of submarines. Exemplary factors include type of vehicle, speed, turning ability, confidence of object location, importance of direct path, level of desire to avoid objects and by what distance, and the like.

Probability and confidence level information can be used both in determining the initial feasibility of edges and in selecting a route from a plurality of routes. In general, there is confidence level information associated both with the probabilistic knowledge of obstacle location/obstacle threat level and with knowledge of the response of the so-called ownship to commands.

One can use confidence levels in the assessment of probability of contact with a region to be avoided. Suppose one obtains a number of possible locations for the enemy from multiple sensors. One simple way in which confidence levels can be used is to use them directly in a cost function. Confidence levels can be used as an indication of certain knowledge of the situation. For example, a route that avoids uncertain situations may be preferable. In one embodiment, the system keeps track of the probability, along each path, that a vehicle is at least a predetermined number of nautical miles from a particular enemy ship.

Figure 3A:
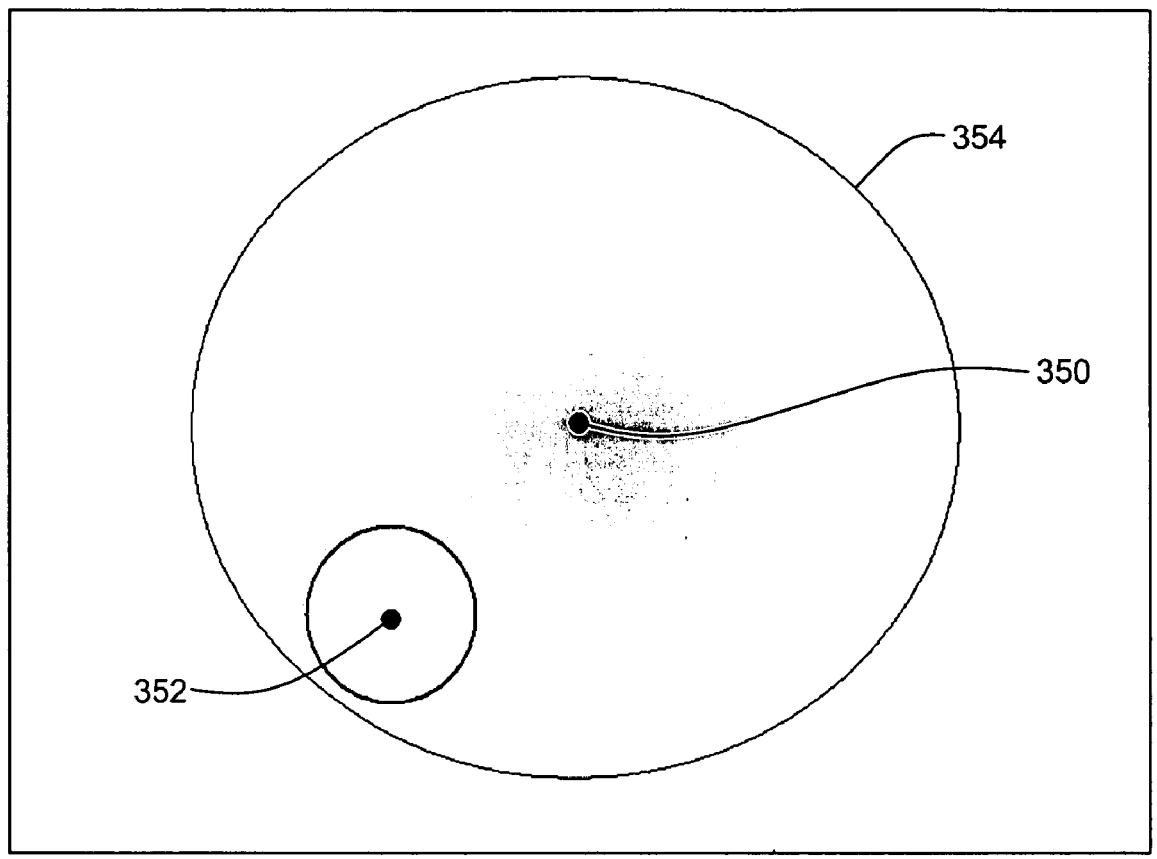
FIG. 3A is a pictorial representation of an exemplary location probability distribution for an object that can form a part of path planning in accordance with the present invention.
Figure 3B:
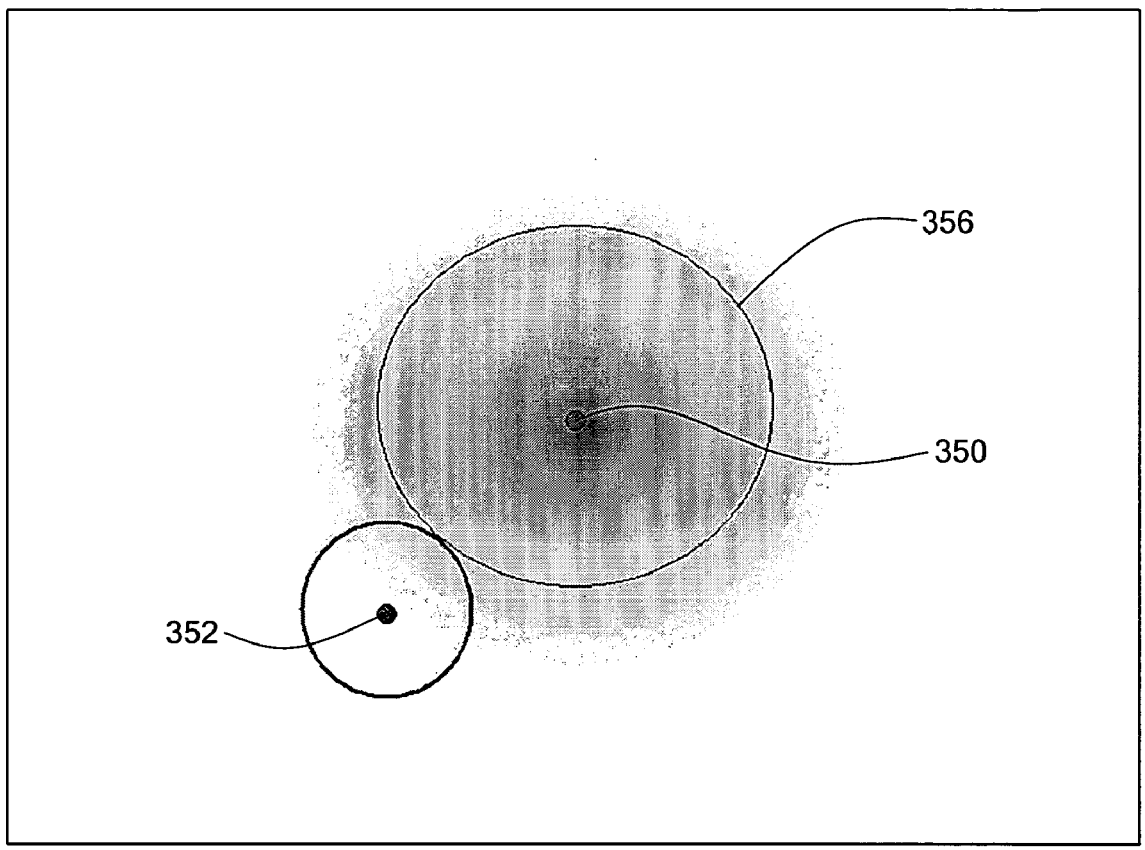
FIG. 3B is a pictorial representation of a further exemplary location probability distribution for an object that can form a part of path planning in accordance with the present invention.

FIGS. 3A and 3B show exemplary probability distributions for a location of an exemplary object 350, which can be considered an enemy ship, in relation to a vehicle 352 for which paths are generated. In FIG. 3A, the object location probability distribution 354 is relatively spread out. In one embodiment, the probability distribution corresponds to a Guassian distribution with a relatively large standard deviation. In FIG. 3B, the object location probability distribution 356 is more focused, such as a Guassian distribution with a relatively small standard deviation.

EXAMPLE

Let $\Pi$ denote a space of probability distributions over the state space $\Sigma$. In order to determine a path, or a selection of paths, from the vehicle's current position to the goal, one builds a particular type of search tree T in $\Pi$. Generally, the nodes in the search tree T are points in the state space $\Pi$ and edges in T are curves in $\Pi$.

The process of adding nodes to the tree T can be referred to as tree extensions. Suppose one is given an existing node n in search tree T and a curve $\alpha$ in probability distribution space with the curve $\alpha$ starting at the location of n. Then the search tree T is extended by the curve $\alpha$ by placing a node $n_p$ at the endpoint of the curve $\alpha$ and adding the curve $\alpha$ to the tree space T. In this case, one may also say that the node n has been extended. If a node is not to be extended, the node is considered dead. One may also refer to tree extension by adding a turn or curve.

The tree can be built by starting the tree T by setting the root node of T at the initial vehicle position. The pseudo code of FIG. 3 shows an exemplary implementation for building the tree. It is understood that the Method Components referred to would define the desired rules for stopping, deterministic tree extension and random tree extension.

In one particular embodiment, which is relatively simple to facilitate an understanding of the invention, candidate path extensions for deterministic tree extension are obtained via two simple rules, which can form a part of the respective model component of FIG. 4.

Initially, a linear path $\alpha$ is added such that the heading and speed of the vehicle are constant on $\alpha$ and are identical to the heading and speed at the node that is extended by $\alpha$. The length of $\alpha$ is determined as described below. The path is then extended by adding a turn such that, at the turn end, the vehicle is heading as close as possible directly towards the goal. The turn is obtained by consulting the vehicle turn model. In one embodiment, the current implementation includes a simple turn model that assumes the turn is an arc of a circle, where the circle radius depends upon vehicle speed at the turn start.

For random extensions, the amount of randomness can be determined and may be varied in accordance with certain criteria. In one embodiment, a random extension is added to a percentage of the leaf nodes, where the percentage is a decreasing function of the number of leaf nodes. These nodes can be chosen randomly. A random extension can be added to a percentage of the leaf nodes, where the percentage is an increasing function of the environment danger, for example. These nodes are chosen randomly. A random extension can be added to all leaf nodes. The number of random extensions added to a node can be varied by a function that depends on the local environmental danger of the node. The number of random extensions added to a node can be varied by a function that depends on the number of leaf nodes. A fixed number of random extensions can be added to a node.

In one embodiment, to determine the amount of randomness, one of the first three conditions above is chosen for a so-called global randomness condition. In addition, one of the last three conditions is also chosen for a so-called local randomness condition.

In determining the amount of randomness, there can also be additional parameters. The local number of tries parameter and the global number of tries parameter. In carrying out an extension, the desired extension is sometimes not feasible. Suppose a node, n, is to be extended by R random extensions, but some of the chosen extensions are not feasible. The local number of tries parameter gives an upper bound on the number of random extension attempts allowed in order to achieve R random extensions.

For the global number of tries parameter, if one chooses a random node to extend it is possible that after the local number of tries the node is not extended at all. Suppose one desires to extend N random nodes, but some of the chosen nodes are not extended after the specified number of tries. The global number of tries parameter gives an upper bound on the number of attempts, at choosing additional nodes, allowed in order to have N nodes extended.

In an exemplary embodiment, the global randomness condition, local randomness condition, and local and global number of tries parameters are determined via user input in a manner well known to one of ordinary skill in the art.

When extending randomly, the random path may be chosen by choosing a random variation of some of the state variable coordinates (while meeting constraints on those coordinates) and leaving the others identical to those in the node that is extended. The random path may also be chosen by choosing a random endpoint (subject to constraints) and asking the vehicle motion model for a path with that point as endpoint and the extended node as start point.

The specifics of edge length depend upon the particular metric on the state or distribution space. Generally, the edge length can be fixed or it can depend upon a function that depends on the environment danger, on task requirements, etc. The edge length should be chosen so that if the endpoints of the path meet the probability feasibility condition, then the entire path does.

Below, some exemplary elements that may be included in Method Component 6 shown in FIG. 4 are discussed. In determining if a new candidate node is feasible, one can evaluate the probability that the node will meet, in space and time coordinates, a region to be avoided. A probability feasibility function returns true if this probability is less than a maximum feasible probability, which can be defined as a function depending upon one or more of the following: an environment danger measure, the precision that can be expected in vehicle movement, the current number of leaf nodes, the amount of danger that is acceptable, and the types of regions that are to be avoided.

It is understood that an environment danger measure is application dependent and may be given by any measure that indicates the amount of danger due to the characteristics of the obstacles and regions to be avoided. For instance the ratio of the area of the no-go regions to the area of the environment might be such a measure. The local environment danger may be the environment danger restricted to a subset of the environment containing the vehicle. Various topological or metric descriptions of the subset to be considered could be used. An example subset would be the portion of physical space within a given distance of the vehicle.

It is understood that a variety of user-specified parameters can be used. Exemplary user-specified constraints that could be used in FIG. 4, for example, are discussed below. It should be noted that further constraints will be readily apparent to one of ordinary skill in the art.

Additional No-Go Distance: The additional no-go distance is a distance such that, if R is a region that the vehicle must avoid, then vehicle must also avoid the region obtained by taking R plus the $\epsilon$-neighborhood of R.

Maximum Vehicle Speed: The maximum speed that the vehicle is allowed to travel under any circumstances.

Desired Vehicle Speed Range: Vehicle speed should lie within this range except in unusual circumstances.

Stop Flag: This flag is set to true if the vehicle is allowed to stop and set to false otherwise.

Maximum Number of Turns Allowed Within a Specified Time Range: The maximum number of course changes that the vehicle is allowed to make within the user specified time range.

Minimum distance between the end and start of two turns:

Illustrative rules that can be used in Method Element 7 of FIG. 4, for example, for halting tree extensions are discussed below. In the current implementation, tree expansion is stopped when a path to the goal has been found or if the vehicle travel time one the shortest partial path is over a travel-time limit parameter. Other possibilities are given below.

Automatically stop tree expansion when a path to the goal has been found or when it is determined that no feasible path can be found.

Automatically stop tree expansion after the path finding application has been running for a certain amount of time.

Stop tree expansion after a certain number of paths to the goal have been found or after a time limit has been reached.

Display the tree during the build process and stop expansion via user request

In another aspect of the invention, exemplary automatic path update conditions can be used as described below.

Update the path automatically if, using updated situational knowledge, it is determined that the probability of the current path intersecting a contact no go region is unacceptably high given the confidence level.

Update the path automatically if a fixed amount of time has passed since the last update.

Update the path automatically using variable time steps, where the local density of the contacts determines the size of the time step. A shorter time step is used if local density is high and a longer time step is used if local density is low.

The inventive Randomized Adaptive (RAd) Route Planning Method handles real-time path-planning for a vehicle operating under kinodynamic constraints in dynamically changing and uncertain environments with probabilistic knowledge of vehicle movement. With appropriate probabilistic models of vehicle motion and environment interfaces, it is applicable to a wide range of vehicle types and environments.

FIG. 5 shows an exemplary implementation of randomized adaptive route planning in accordance with the present invention. The notation below defines certain terms used above.

T The search tree that is constructed.

SN The number of edges that we initially attempt to add to the root node. This is an input parameter.

RN The maximum number of nodes that we extend randomly on a given iteration. This is an input parameter.

RE The number of random extensions that we attempt to add to a node that is randomly extended. This is an input parameter.

MEL The maximum allowed edge length. This is an input parameter.

mEL The minimum allowed edge length. This is an input parameter.

MSp The maximum allowed speed. This is an input parameter.

mSp The minimum allowed speed. This is an input parameter.

MTr The maximum number of turns allowed. This is an input parameter.

VMM The vehicle motion model.

EPM The probabilistic environment model.

Turn Wedge Given the current vehicle trajectory and state, the Turn Wedge is defined by the max possible turn left and the max possible turn right.

Stop Flag A Boolean flag set to TRUE if stops are allowed.

MTm Maximum allowed time for a route.

Active Node Any node in T that may be included in output routes.

Stop Condition A condition that determines when the tree build is stopped.

In general, in order to determine a route, or a selection of routes, from the vehicle's current position to the goal, one first builds a particular type of search tree in $\Xi$, T space, where $\Xi$ is the N-dimensional spatial coordinate space and T is time. Edges in the tree are oriented line segments and nodes are points. The tree is rooted at $(x_0, t_0)$, where $x_0$ is the current spatial position of the vehicle at current time $t_0$. One can add nodes to this tree using a combination of deterministic rules and randomized extension, for example. In building the search tree, a simulation is performed forward in time, using a probabilistic model of environment behavior and models of vehicle motion. Candidate new nodes are not added to the tree unless the probability of contact is determined to be below a (parameter) threshold, with confidence level above another (parameter) threshold. These thresholds may be constant or taken as functions of the environment. For example, if the environment contains a fair amount of open space, the probability of contact threshold may be set low in order to force the vehicle into larger areas of open space. The lengths of the edges that are added depend upon the environment and this length may vary over the region and with time. Any edge length should be short enough (in space and time) that if the added end node is determined to be feasible by probability of contact check, then the edge is also feasible under probability of contact criteria.

It is assumed that the probability models are continuous over space and time. Edge length may be altered by speed changes as well as by distance traveled changes. However, the number of speed changes and the amount of change may be limited by user input. It should be noted that tree edges may be (and generally are) shorter than maximal straight-line segments in the path, depending upon vehicle motion constraints.

It is also possible to check user-defined conditions, other than probability of contact, in determining the feasibility of adding a node. For example, there may be a maximum number of allowed turns over a given time or distance, a minimum time or distance between turns, a maximum path length, a maximum time, or a minimum and maximum speed. In adding nodes and edges, a vehicle model may also be queried to determine if the added edge and node meets vehicle motion constraints and for the probability that the vehicle will actually travel along the edge if given a command to do so.

Some possible deterministic rules for adding an edge and node to an existing leaf node are to add a node (if possible by feasibility checks) straight ahead in space at the current speed, directly towards the goal (a turn would be included and the speed would be determined by the motion model), towards the closest node on the previous path found. One can also add edges towards the goal and straight ahead, only to those nodes in the largest Voronoi regions of the Voronoi diagram determined by the tree. It is understood that deterministic rules are not necessarily limited to these. In a tight situation it may also be desirable to allow adding edges to nodes other than leaf nodes. The number of random edges added (subject to feasibility constraints) may be determined by a combination of the size of the existing tree and environmental conditions. If the environment is hazardous, more random nodes could be added to allow for more options.

The tree is extended until at least one path is found, it is determined that no feasible path can be found under the current conditions, using currently available knowledge, or other "stopping" conditions are met. After the tree is built, either a "best" path to the goal or a "best" partial path is found. In one embodiment, an overall metric that is a weighted sum of metrics is used to determine a "best" path. In such an implementation, the sub-metrics that can be included in the overall metric are 1) path length, 2) path time, 3) point of closest contact, 4) average point of closest contact, 5) maximum probability of contact 6) average probability of contact, 7) number of course changes, etc.

It is understood that the selection of metrics is not limited to these metrics, and the particular metric used may depend upon the application and be user defined. The weights in the overall metric may also depend upon the application and be user defined in a manner well known to one of ordinary skill in the art.

Once the tree has been constructed and a desired path is found in the tree, the vehicle proceeds to follow that route. Since the environment may be dynamic and uncertain, this route may need to be updated due to unanticipated environmental changes. The inventive path planning system also includes conditions for optional automatic route update. The system is able to modify the build of the tree based upon environmental conditions.

In an exemplary embodiment, the tree data structure is specified by a set of node data structures. The node connectivity information for the tree is given by child and parent pointers contained in the node data structure. In one particular embodiment, the node data structure contains the following:

List of pointers to Child Nodes
Pointer to Parent Node
Dead Node Flag
State Space Information
Probability Distribution Information
Variables relevant to Metrics for Cost of Path
Cost of Path from the root node
Environmental Information
Pointer to Parent Edge where a parent node is, considering a tree as a directed graph, a parent node of a given node is the node at the start of the edge incoming to that given node. The incoming edge is a parent edge. The child nodes of a given node consist of all nodes having that given node as a parent. A dead node flag can be a Boolean variable indicating whether or not it is possible to continue from the node. If the Dead Flag is set to True then the sub-tree having the parent of the node as root node and containing the node is killed off. State Space Information is application dependent. Some exemplary variables that might be used as state space information in an application that involves a traveling vehicle include speed, acceleration, heading, geographic location (for example longitude, latitude, and elevation), and time. Note that in general, these variables are associated with probability distributions and that the values for these variables would be given by the mean of the relevant probability distribution.

In general, probability distribution information is application dependent.

Illustrative fields that might be contained in probability distribution information in an application that involves a traveling vehicle (ownship) include 1) either joint or independent distributions for one or more of the variables contained in the state space information; and 2) 99%, 95%, . . . confidence intervals/regions for each of the represented distributions. It should be noted that these do not have to be explicitly represented, as they can also be obtained from the distributions.

As noted above confidence level information can be obtained from distributions. Also, confidence intervals are part of the information contained in probability distributions and can be used to truncate distributions. The integral (or sum of values over the domain) of a probability distribution function (PDF) has a value of one. If the domain is one dimensionally connected, then an X % confidence interval is a connected subset of the domain, over which the integral (or sum of values over the domain) of the PDF have a value of X. In the case where the domain is not one-dimensional, the term confidence region can be used. Confidence intervals are typically taken to be centered at the mean.

The variables relevant to metrics for cost of path may be application and metric dependent. Exemplary variables that might be used as a metric in an application that involves a vehicle (ownship) traveling through a region containing moving obstacles that must be avoided include geographic length, travel time, number of turns, maximum turn angle, minimum distance to an obstacle at a point of closest approach, average size of 99% confidence regions over the path for the location of the obstacles having closest approaches, and average size of 99% confidence regions over the path for the location of the ownship.

In one embodiment, point of closest approach assumes given a path, P, a vehicle, V, traveling along P, and a set of moving obstacles, {O1, O2, . . . , On}. Let Di denote the minimum of distance(V, Oi) over P and let Dmin=min{Di: 1<=I<=n}. Then all locations of V at which Dmin occurs are points of closest approach and Dmin is the min distance to an obstacle at a point of closest approach. The obstacle Oi has a point of closest approach if Di=Dmin.

In an illustrative embodiment, a metric used to determine the so-called cost of path is application dependent. An exemplary metric includes a weighted sum of the normalized values of metric-associated variables. Examples of metric-associated variables include the variables described above (variables relevant to metrics for cost of path).

In an exemplary weighted sum for metric, suppose variables to consider in the metric are {V1, V2, . . . , Vn}. Let {W1, W2, . . . , Wn} be a set of non-negative real numbers. Then a weighted sum metric is given by (W1*V1+ W2*V2+. . .+Wn*Vn)/(W1+W2+ . . . +Wn). Certain ones of the variables considered in the metric may be more important than others and therefore weighted more heavily (e.g., larger W).

As will be understood by one of ordinary skill in the art, normalized values can be used for metrics. When comparing quantities having different units of measure or different scales, one can normalize the values to a common frame of reference. For instance, when normalizing the values for use in the metric, one may normalize so all values lie in the interval [0, 1]. In order to do this, one can set minimum and maximum considered values and determine a normalized value=value/(max−min). Note that this simple case assumes the correspondence between small/large values and desirable/undesirable behavior is constant over all variables.

In one embodiment, environmental information is application dependent. Exemplary fields that might be contained in environmental information in an application that involves a vehicle (ownship) traveling through a region containing moving obstacles that must be avoided include a probability distribution map for the locations of the obstacles at the node time (e.g., the time contained in the state space information) and 99% confidence regions for obstacles resulting in a point of closest approach.

It should be noted that edges do not necessarily correspond to straight segments and can be more general curves. For instance, a turn can be considered as an edge. In an application that involves a traveling vehicle (ownship), an edge would typically specify the most likely location of the own ship as it travels between nodes.

In an exemplary embodiment, the edge specification is application dependent. The particular representation of the turn could take different forms depending upon the application. Exemplary fields that might be contained in the Edge Specification in an application that involves a traveling vehicle (ownship) include A curve given as a curve parameterized by time or as a piecewise linear path in geometric-position/time space or in position/time/speed.
   An approximate or average speed over the edge or a function of time—specifying speed over the edge, and.
   A "confidence"

As will be appreciated by one of ordinary skill in the art, known randomized path planning methods do not adapt the amount of randomness to the state of the environment or the existing search tree structure. They also do not perform real-time planning using simulation that incorporates probabilistic knowledge of a dynamically changing environment. The inventive method is also different from conventional methods in that it uses deterministic rules along with randomness, where the amount of randomness is adaptive.

Figure 6:
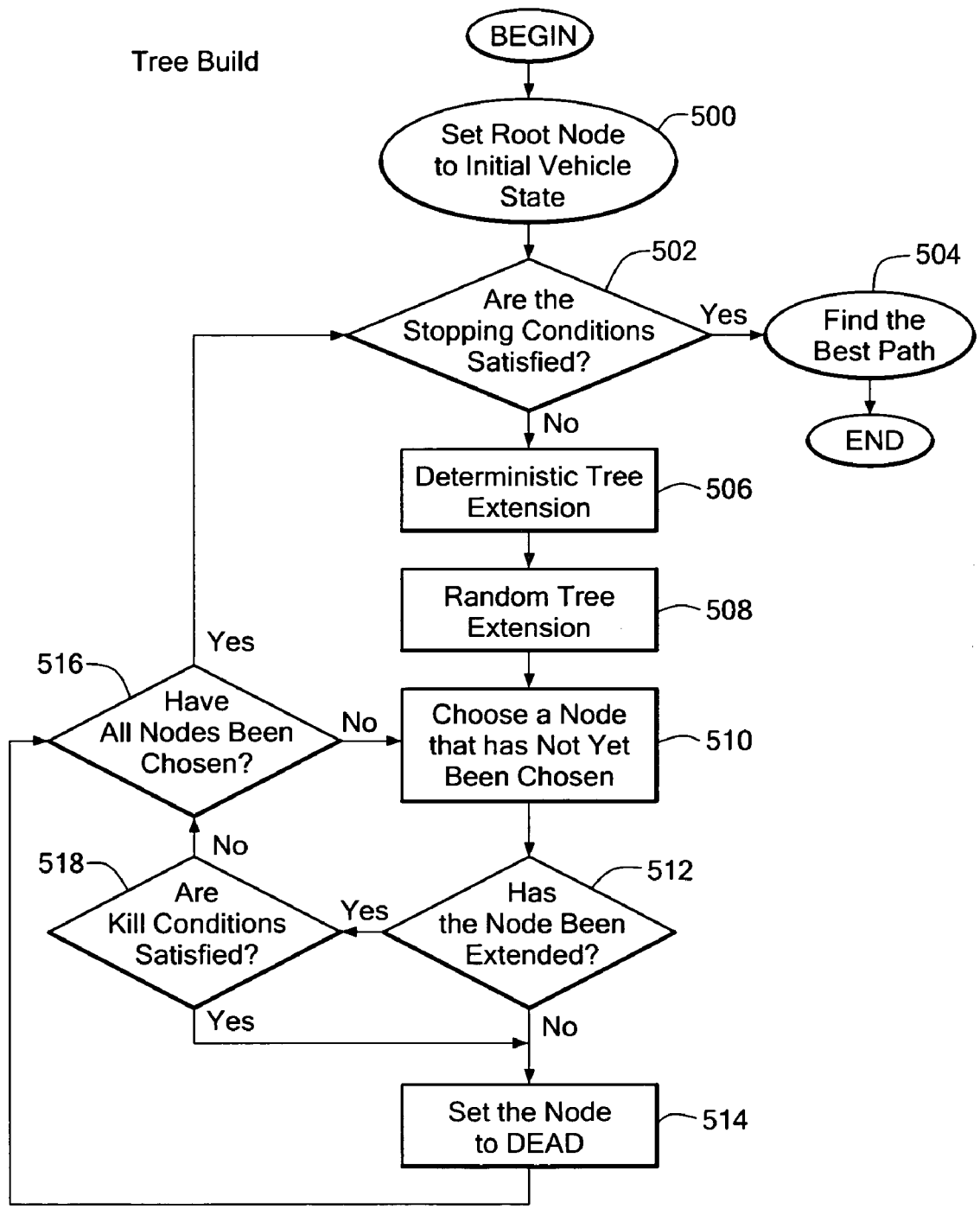
FIG. 6 is a flow diagram showing an exemplary sequence of steps for implementing path planning in accordance with the present invention.

FIG. 6 shows an exemplary sequence of steps for implementing path planning in accordance with the present invention in conjunction with the processing details described above. In step 500, the root node is set to an initial state for the vehicle that traveling to a goal location. In step 502, it is determined whether the stopping conditions are satisfied. If so, which will typically be after a path is at least partially planned, the "best" path is found in step 504. If not, in step 506, the tree is extended deterministically, e.g., using a set of deterministic rules such as those shown in FIG. 7. In step 508, the tree is extended with random extension rules, such as those set forth in FIG. 8. A further node is chosen in step 510 that has not yet been processed.

In step 512, it is determined whether the node has been extended. If not, in step 514 the node is considered dead and in step 516 it is determined whether all nodes have been chosen. If not, processing continues in step 510 where a further node is selected. If so, processing continues in step 502 where stopping conditions are examined.

If the node has been extended as determined in step 512, in step 518 it is determined whether kill conditions are satisfied. If so, processing continues in step 514 where the node is set to dead and if not, processing continues in step 516.

Figure 7:
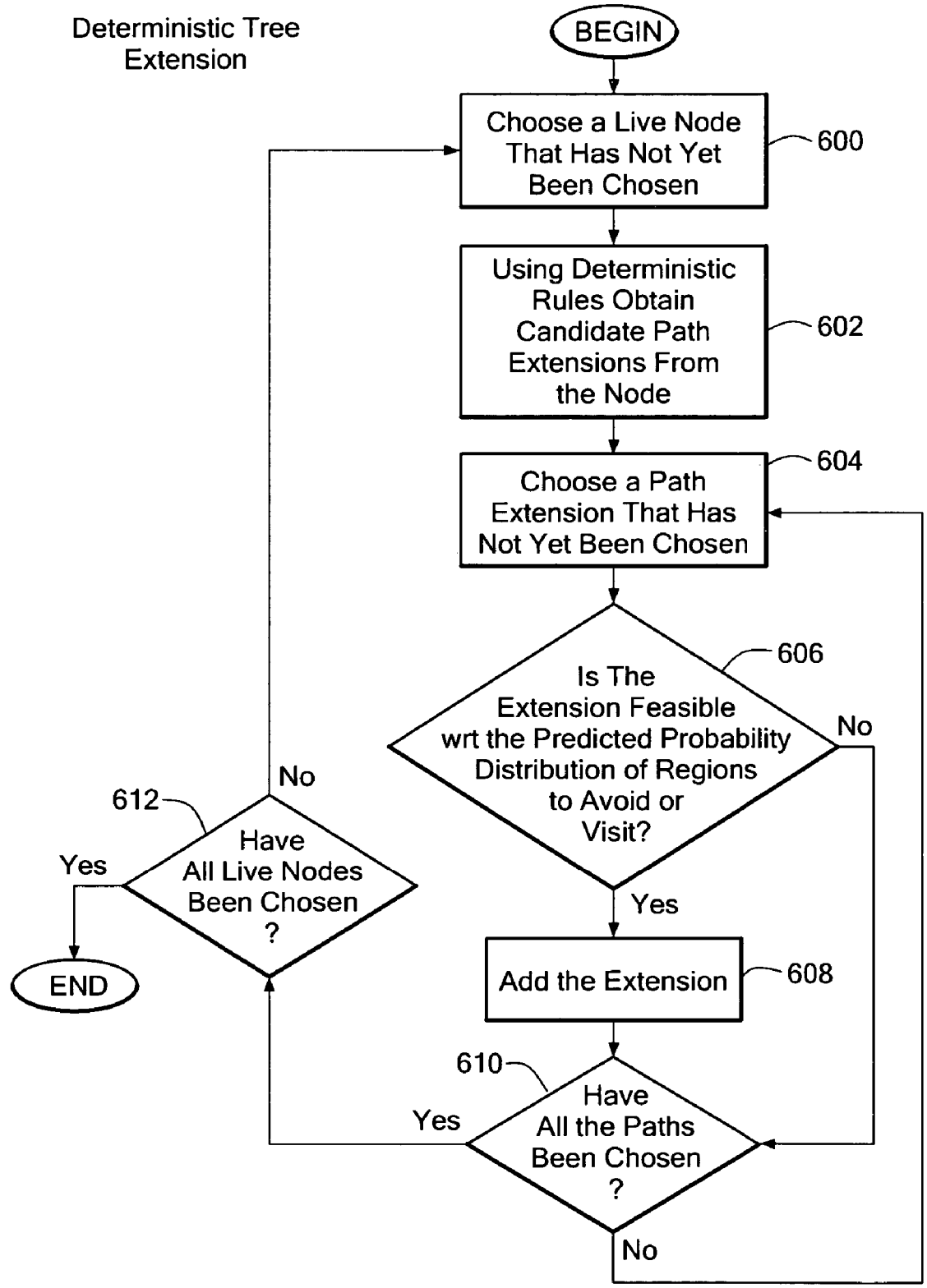
FIG. 7 is a flow diagram showing further details for deterministic tree extensions of FIG. 6.

FIG. 7 shows further details for deterministic tree extension in accordance with the present invention. In step 600, a live node is selected that has not yet been chosen. Candidate path extensions are deterministically generated in accordance with predetermined rules in step 602. In step 604, a path extension is selected and in step 606 it is determined whether the path extension is feasible with respect to the predicted probability distribution of regions to avoid or visit. If so, the extension is added in step 608. If not, in step 610 it is determined whether all path have been chosen. If not, processing continues in step 604 where a further node is selected. If so, it is determined in step 612 whether all live nodes have been processed. If so, deterministic path extension is complete and if not, processing of further nodes continues in step 600.

Figure 8:
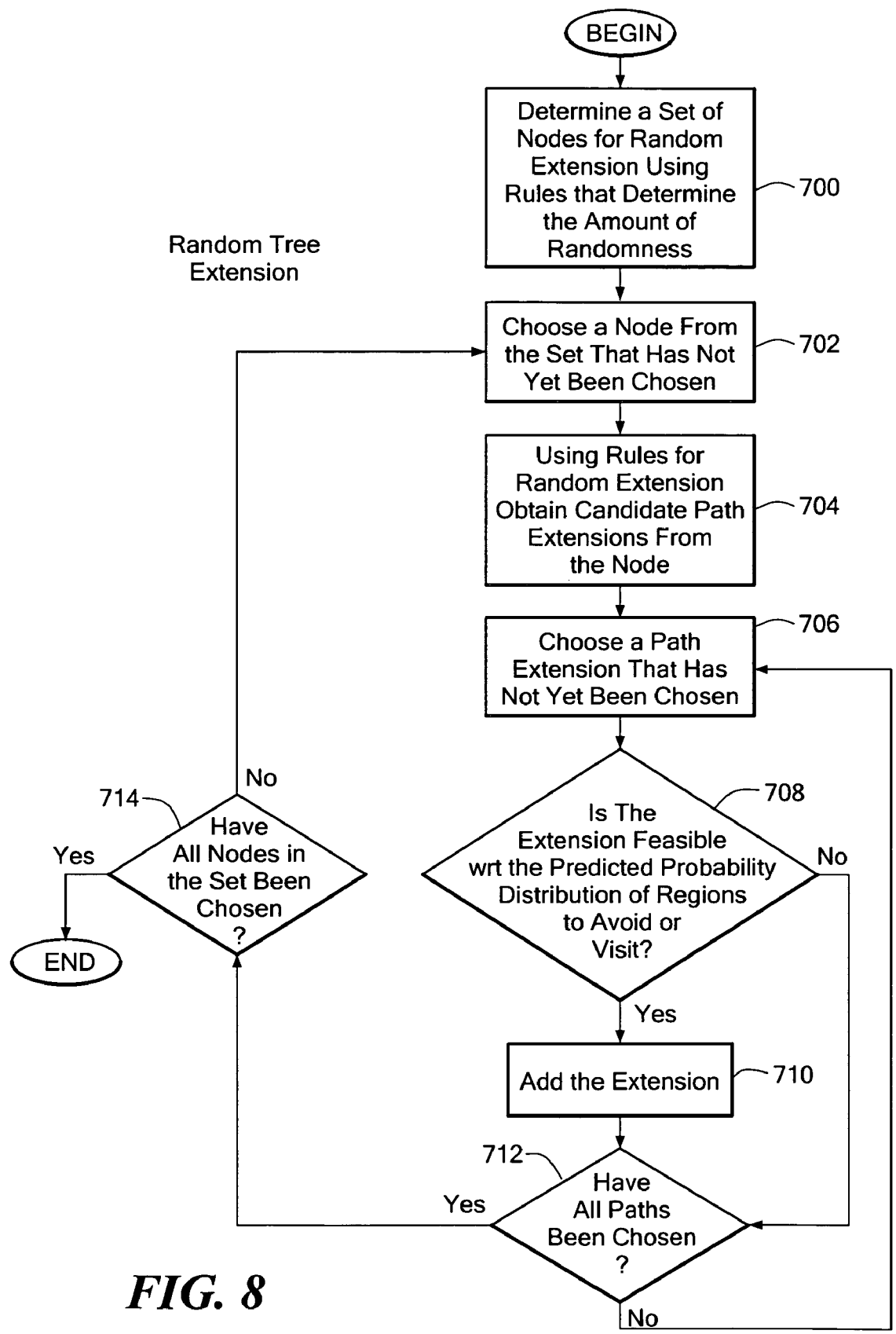
FIG. 8 is a flow diagram showing further details for the random tree extensions of FIG. 6.

FIG. 8 shows further details of random path extension in accordance with the present invention. In step 700, a set of nodes for random extension is determined based upon rules that define a desired amount of randomness. A node is then selected in step 702 and in step 704 candidate path extensions for the node are obtained using ransom extension rules. In step 706, a path extension is selected that has not yet been processed and in step 708 it is determined whether the extension is feasible in view of the predicted probability distribution of regions to avoid or visit. If so, in step 710 the random extension is added, and if not, in step 712 it is determined whether all paths have been selected. If not, processing continues in step 706 where a further path is selected and if so, it is determined whether all nodes in the set have been selected. If so, random extensions are completed. If not, processing continues in step 702 where a further node is selected.

Figure 9:
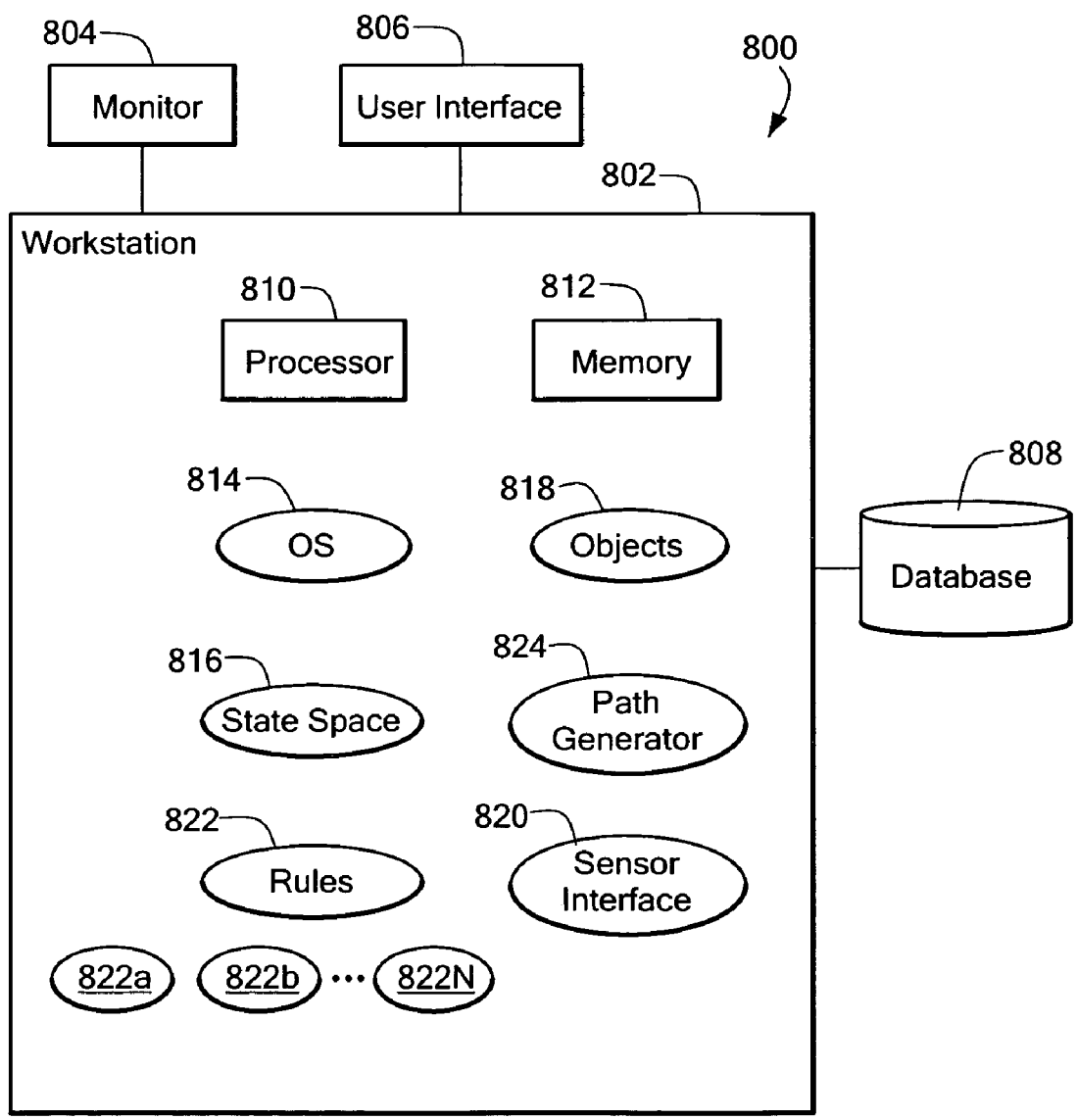
FIG. 9 is a schematic depiction of a path planning system in accordance with the present invention.

FIG. 9 shows an exemplary architecture for a path planning system 800 in accordance with the present invention. The system includes a workstation 802 having a monitor 804 and a user interface 806, such as a keyboard. A database 808 can be external to the workstation or internal.

In one particular embodiment, the workstation 802 includes a processor 810 coupled to a memory 812. An operating system 814 operates on the processor 810 in conjunction with the memory 812 in a manner well known in the art. Any suitable operating system, including Windows-based, Unix-based, and Linux-based systems can be used. Various applications can run on the workstation under the operating system.

The workstation 802 includes a series of modules that provide path planning for a vehicle in accordance with the present invention. While an exemplary embodiment is shown, it is understood that a wide variety of architectures can be used without departing from the present invention. In addition, one of ordinary skill in the art will recognize that a partition between hardware and software modules and devices can be varied to meet the needs of a particular application.

A state space module 816 maintains the state space, which is described in detail above. In general, the state space module 816 utilizes state space information and object parameters to generate the potential paths in conjunction with other modules. An object module 818 manages the objects, including the vehicle for which the path is being planned, identified in the state space. Upon receiving updated sensor information from a sensor interface module 820, for example, the object module 818 updates object information.

A rule module 822 maintains the various path generation rules and a path generator module 824 generates path branches based upon the rules, as described in detail above. The rule module 822 can include various submodules 822*a*-N to implement the various rules.

It is understood that various components of the system can be distributed. For example, new and modified rules can be downloaded from a central location. Similarly, sensors can be located onboard a vehicle and/or sensor information can be provided to the system. In addition, path planning can be generated remotely from a vehicle and a given path can be sent to the vehicle.

While the invention is primarily shown and described in conjunction with routing a submarine through hostile enemy territory, it is understood that the invention is applicable to moving objects in general for which it is desired to plan a path to a goal location. The inventive path planning system considers paths through a space of probability distributions resulting in a high level of flexibility, fidelity to the actual situation, and less loss of information. For example, related to some known applications for routing through hostile territory, the method is compatible with, and can be used with, Bayesian methods for target tracking. In an exemplary embodiment, probabilistic information gained from Bayesian methods can be incorporated into path finding and into the output path. This allows for the display of probabilistic information on a graphics display, so that a user can guide the vehicle with knowledge of danger probabilities. It also allows perturbations of the vehicle track to be made.

It is further understood that the invention may be applicable to more than routing physical vehicles. For instance, the inventive path planning system may be used in a situation where a computer network is under attack and it is desired to maintain some level of information flow. In this case, there could be estimated probabilities that certain network components have been compromised or will be compromised within some time frame. These could be considered regions to be avoided.

One skilled in the art will appreciate further features and advantages of the invention based on the above-described embodiments. Accordingly the invention is not to be limited by what has been particularly shown and described, except as indicated by the appended claims. All publications and references cited herein are expressly incorporated herein by reference in their entirety.

What is claimed is:

1. A method of planning at least one path for a vehicle in a state space from a starting position to a goal position to avoid a plurality of static and/or dynamic objects, comprising:

associating predetermined attributes with the plurality of static objects and/or the plurality of dynamic objects located in the state space;

generating a probabilistic tree in the state space including a plurality of branches extending from the starting position of the vehicle towards the goal position located in the state space, generating the probabilistic tree in the state space comprises extending each of a first plurality of edges a first predetermined distance and direction from the starting position in the state space to each of a corresponding first plurality of nodes based on the plurality of random tree extension rules and the plurality of deterministic tree extension rules for forming first segments of each of the plurality of branches of the probabilistic tree;

extending the plurality of branches of the probabilistic tree towards the goal position located in the state space based on at least one of a plurality of random tree extension rules and a plurality of deterministic tree extension rules until satisfying a predetermined stopping condition;

evaluating at least a first branch of the plurality of branches of the probabilistic tree for determining whether the first branch of the plurality of branches of the probabilistic tree satisfies predetermined trajectory path constraints;

extending at least one of a next successive plurality of edges from each of the first plurality of nodes a second predetermined distance and direction in the state space to each of a corresponding next successive plurality of nodes based on the plurality of random tree extension rules and the plurality of deterministic tree extension rules for forming next successive segments of each branch of the plurality of branches of the probabilistic tree;

repeating cyclically extension of each branch of the plurality of branches of the probabilistic tree until at least the first branch of the plurality of branches of the probabilistic tree satisfies the stopping condition;

evaluating whether extension of one or more branches of the plurality of branches of the probabilistic tree violate object avoidance constraints;

suspending further extension of the one or more branches of the plurality of branches if a determination is made that extension of the one or more branches of the plurality of branches of the probabilistic tree violate the object avoidance constraints; and resuming extension of the one or more branches of the plurality of branches if a determination is made that extension of the one or more branches of the plurality of branches of the probabilistic tree no longer violates the object avoidance constraints.

2. The method of claim 1, wherein if the first branch of the plurality of branches of the probabilistic tree conforms to the predetermined trajectory path constraints, the method further includes:

declaring the first branch of the plurality of branches of the probabilistic tree as the at least one preferred trajectory path for the vehicle in the state space; and controlling the vehicle to follow the at least one preferred trajectory path in the state space for moving the vehicle from the starting position towards the goal position in the state space.

3. The method of claim 2, wherein if the first branch of the plurality of branches of the probabilistic tree fails to conform to the predetermined trajectory path constraints, the method further includes:

extending the plurality of branches of the probabilistic tree further based on the at least one of the plurality of random tree extension rules and the plurality of deterministic tree extension rules until at least one branch of the plurality of branches of the probabilistic tree satisfies the predetermined stopping condition and conforms to the predetermined trajectory path constraints.

4. The method of claim 3, further including:

declaring the at least one branch of the plurality of branches of the probabilistic tree that couples the starting position to the goal position and that conforms to the predetermined trajectory path constraints as the at least one preferred trajectory path for the vehicle in the state space; and controlling the vehicle to follow the at least one preferred trajectory path in the state space for moving the vehicle from the starting position towards the goal position in the state space.

5. The method of claim 1, wherein satisfying the predetermined stopping condition includes at least one of satisfying a predetermined time constraint and satisfying a predetermined travel distance constraint.

6. The method of claim 1, wherein associating predetermined attributes with the plurality of static objects and the plurality of dynamic objects located in the state space includes associating at least one of a position value, a velocity value, a direction value, an acceleration value and a time value.

7. The method of claim 1, wherein extending the plurality of branches of the probabilistic tree based on the plurality of random tree extension rules includes at least one of extending each branch into the state space that is void of the plurality of static objects and the plurality of dynamic objects and extending each branch into the state space that is void of other branches of the plurality of branches of the probabilistic tree.

8. The method of claim 1, wherein the first deterministic rule to add a linear path comprises a rule to add a linear path such that a heading and speed of the vehicle are constant.

9. The method of claim 1, wherein determining whether the first branch of the plurality of branches of the probabilistic tree satisfies the predetermined trajectory path constraints includes determining whether the first branch of the plurality of branches of the probabilistic tree satisfies at least one of a maximum travel distance value, a maximum turn angle value, a minimum distance value to the plurality of static objects and the plurality of dynamic objects.

* * * * *

UNITED STATES PATENT AND TRADEMARK OFFICE
CERTIFICATE OF CORRECTION

PATENT NO.        : 7,447,593 B2
APPLICATION NO.   : 10/811460
DATED             : November 4, 2008
INVENTOR(S)       : Regina Estkowski et al.

It is certified that error appears in the above-identified patent and that said Letters Patent is hereby corrected as shown below:

Col. 2, line 5, delete "an" and replace with -- and --.

Col. 4, line 25, delete "$\phi_0$:" and replace with -- $\varphi_O$: --.

Col. 4, line 33, delete "$\phi_0$" and replace with -- $\varphi_O$ --.

Col. 4, line 36, delete "$\phi_0$," and replace with -- $\varphi_O$, --.

Col. 5, line 6, delete "Euclidian" and replace with -- Euclidean --.

Col. 5, line 11, delete "distribution" and replace with -- distributions --.

Col. 5, line 51, delete "is it" and replace with -- it is --.

Col. 7, line 11, delete "include" and replace with -- include: --.

Col. 9, line 18, delete "extend it" and replace with -- extend, it --.

Col. 9, line 27, delete "parameters," and replace with -- parameter --.

Col. 10, line 8, delete "then vehicle" and replace with -- then the vehicle --.

Col. 10, line 20, delete "turns:" and replace with -- turns. --.

Col. 10, line 25, delete "one" and replace with -- on --.

Col. 10, line 38, delete "request" and replace with -- request. --.

Col. 10, line 43, delete "no go" and replace with -- no-go --.

Col. 11, line 33, delete "extension," and replace with -- extensions, --.

Col. 12, line 17, delete "found, it" and replace with -- found and it --. (check)

Col. 12, line 65, delete "as root" and replace with -- as the root --.

Col. 13, line 42, delete "given a" and replace with -- a given --. (check)

UNITED STATES PATENT AND TRADEMARK OFFICE
CERTIFICATE OF CORRECTION

PATENT NO.        : 7,447,593 B2
APPLICATION NO.   : 10/811460
DATED             : November 4, 2008
INVENTOR(S)       : Regina Estkowski et al.

It is certified that error appears in the above-identified patent and that said Letters Patent is hereby corrected as shown below:

Col. 14, line 20-21, delete "own ship" and replace with -- own-ship --. (check)

Col. 14, line 27, delete "include" and replace with -- include: --.

Col. 14, line 33, delete ""confidence"" and replace with -- "confidence." --.

Col. 14, line 47, delete "that traveling" and replace with -- that is traveling --.

Col. 15, line 8, delete "path" and replace with -- paths --.

Col. 15, line 56, delete "planned, identified" and replace with -- planned and identified --. (check)

Col. 16, line 29, delete "time frame." and replace with -- timeframe. --.

Signed and Sealed this

Twentieth Day of January, 2009

JON W. DUDAS
*Director of the United States Patent and Trademark Office*